United States Patent
Li et al.

(10) Patent No.: US 12,356,482 B2
(45) Date of Patent: Jul. 8, 2025

(54) COMMUNICATION METHOD AND APPARATUS, AND DEVICE

(71) Applicant: HUAWEI TECHNOLOGIES CO., LTD., Guangdong (CN)

(72) Inventors: Tie Li, Beijing (CN); Yongping Zhang, Beijing (CN); Xi Zhang, Chengdu (CN); Xuesong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 392 days.

(21) Appl. No.: 17/896,830

(22) Filed: Aug. 26, 2022

(65) Prior Publication Data

US 2023/0189369 A1    Jun. 15, 2023

Related U.S. Application Data

(63) Continuation of application No. PCT/CN2020/077332, filed on Feb. 29, 2020.

(51) Int. Cl.
| | |
|---|---|
| *H04W 76/18* | (2018.01) |
| *H04W 24/10* | (2009.01) |
| *H04B 7/06* | (2006.01) |

(52) U.S. Cl.
CPC ........... *H04W 76/18* (2018.02); *H04W 24/10* (2013.01); *H04B 7/0639* (2013.01)

(58) Field of Classification Search
CPC ..... H04W 76/18; H04W 24/10; H04B 7/0639
See application file for complete search history.

(56) References Cited

U.S. PATENT DOCUMENTS

| | | | |
|---|---|---|---|
| 2018/0262313 A1 | 9/2018 | Nam et al. | |
| 2019/0190829 A1* | 6/2019 | Zhong | H04L 47/10 |
| 2019/0253115 A1* | 8/2019 | Park | H04W 16/28 |
| 2022/0140959 A1* | 5/2022 | Pedersen | H04L 5/0053 |
| | | | 370/329 |

(Continued)

FOREIGN PATENT DOCUMENTS

| | | |
|---|---|---|
| CN | 108243430 A | 7/2018 |
| CN | 109429261 A | 3/2019 |

(Continued)

OTHER PUBLICATIONS

MediaTek Inc., "Considerations on Beam Management Framework," 3GPP TSG-RAN WG2 Meeting #99, R2-1708000 (Resubmission of R2-1706438), Berlin, Germany, Aug. 21-25, 2017, 5 pages.

(Continued)

*Primary Examiner* — Ajay Cattungal
(74) *Attorney, Agent, or Firm* — Fish & Richardson P.C.

(57) ABSTRACT

This application provides a communication method and apparatus, and a device. One example method includes the following steps: receiving a first message from a network device, where the first message indicates a terminal device to measure a reference signal of a first cell and report a configuration measurement result in a physical layer coding format, and the first cell includes at least one non-serving cell of a terminal device, or the first cell includes at least one serving cell and the at least one non-serving cell of the terminal device; and obtaining a measurement result of the first cell based on the first message.

23 Claims, 7 Drawing Sheets

Network device

Terminal device

(56) References Cited

U.S. PATENT DOCUMENTS

2022/0190939 A1* 6/2022 Zhang .................. H04B 7/0695
2023/0096338 A1* 3/2023 Koskela .............. H04W 72/232
370/331

FOREIGN PATENT DOCUMENTS

| CN | 110831047 A | 2/2020 |
|---|---|---|
| JP | 2015508609 A | 3/2015 |
| WO | 2018175891 A1 | 9/2018 |
| WO | 2018232090 A1 | 12/2018 |

OTHER PUBLICATIONS

Huawei et al., "Views on beam-based mobility in NR," 3GPP TSG RAN WG 1 Meeting #97, R1-1907543, Reno, USA, May 13-17, 2019, 4 pages.

3GPP TS 38.133 V16.2.0, "3rd Generation Partnership Project; Technical Specification Group Radio Access Network; NR; Requirements for support of radio resource management (Release 16)," Dec. 2019, 1049 pages.

3GPP TS 38.212 V16.0.0, "3rd Generation Partnership Project; Technical Specification Group Radio Access Network; NR; Multiplexing and channel coding (Release 16)," Dec. 2019, 145 pages.

3GPP TS 38.214 V16.0.0, "3rd Generation Partnership Project; Technical Specification Group Radio Access Network; NR; Physical layer procedures for data(Release 16)," Dec. 2019, 147 pages.

3GPP TS 38.215 V16.0.1, "3rd Generation Partnership Project; Technical Specification Group Radio Access Network; NR; Physical layer measurements (Release 16)," Jan. 2020, 21 pages.

3GPP TS 38.300 V16.0.0, "3rd Generation Partnership Project; Technical Specification Group Radio Access Network; NR; NR and NG-RAN Overall Description; Stage 2 (Release 16)," Dec. 2019, 101 pages.

3GPP TS 38.306 V15.8.0, "3rd Generation Partnership Project; Technical Specification Group Radio Access Network; NR; User Equipment (UE) radio access capabilities (Release 15)," Dec. 2019, 60 pages.

3GPP TS 38.321 V15.8.0, "3rd Generation Partnership Project; Technical Specification Group Radio Access Network; NR; Medium Access Control (MAC) protocol specification (Release 15)," Dec. 2019, 78 pages.

3GPP TS 38.331 V15.8.0, "3rd Generation Partnership Project; Technical Specification Group Radio Access Network; NR; Radio Resource Control (RRC) protocol specification (Release 15)," Dec. 2019, 532 pages.

Extended European Search Report in European Appln No. 20921688.6, dated Mar. 13, 2023, 11 pages.

International Search Report and Written Opinion in International Appln. No. PCT/CN2020/077332, mailed on Nov. 30, 2020, 17 pages (with English translation).

Ericsson, "Lower-layer mobility enhancements," 3GPP TSG-RAN WG1 Meeting #99, R1-1912060, Reno, USA, Nov. 18-22, 2019, 11 pages.

Office Action in Japanese Appln. No. 2022-551720, mailed on Oct. 16, 2023, 11 pages (with English translation).

* cited by examiner

COMMUNICATION METHOD AND APPARATUS, AND DEVICE

CROSS-REFERENCE TO RELATED APPLICATIONS

This application is a continuation of International Application No. PCT/CN2020/077332, filed on Feb. 29, 2020, the disclosure of which is hereby incorporated by reference in its entirety.

TECHNICAL FIELD

This application relates to the field of communication technologies, and in particular, to a communication method and apparatus, and a device.

BACKGROUND

A fifth-generation mobile communication network (5th generation mobile networks, 5G) new radio (new radio, NR) introduces a high frequency band, to implement a wider bandwidth and a higher transmission rate. Because a frequency is high, severe fading may occur during signal transmission in the space. Therefore, the 5G NR uses a beamforming (beam forming, BF) technology to improve performance.

In addition, mobility management is always an important part of wireless mobile communication, and can ensure that a communication link between a network device and a terminal device is not interrupted due to movement of the terminal device. In 5G NR, mobility management is mainly performed in an inter-cell (inter-cell mobility) manner and in an intra-cell (intra-cell mobility) manner, and measurement and reporting are main steps of mobility management. Usually, a specific measurement and reporting process includes: The network device performs measurement configuration and reporting configuration for the terminal device. The terminal device performs measurement on a corresponding configuration resource based on the measurement configuration of the network device. After the measurement, the measurement result is reported to the network device based on the reporting configuration of the network device, so that inter-cell handover and intra-cell handover are performed based on a measurement result.

Because steps of inter-cell and intra-cell measurement and reporting are different, a protocol specifies that radio resource management (radio resource measurement, RRM) is used for inter-cell mobility management, and beam management (beam management, BM) is used for intra-cell mobility management.

Both RRM measurement configuration information and reporting configuration information of the network device are notified to the terminal device by using radio resource control (radio resource control, RRC) layer signaling. A reference signal of RRM measurement may include: a reference signal of a serving cell (serving cell) and a reference signal of a non-serving cell (non-serving cell). A type of the reference signal may include: a synchronization signal/physical broadcast channel block (synchronization signal/physical broadcast channel block, SSB), a channel state information-reference signal (channel state information-reference signal, CSI-RS), and the like. A measurement metric may include a cell level (cell level) and a beam level (beam level) of an RRC layer (also referred to as a layer 3, Layer 3), for example, reference signal received power (reference signal Receive power, RSRP), reference signal received quality (reference signal receive quality, RSRQ), and a signal to interference plus noise ratio (signal interference noise radio, SINR). A configured cell may be an intra-frequency cell, an inter-frequency cell, or an inter-system cell. A manner of reporting a measurement result is that the terminal device reports the measurement result to the network device after encapsulating the measurement result in an RRC layer format.

Both measurement configuration information and reporting configuration information of the BM by the network device are notified to the terminal device by the using RRC layer (that is, a Layer 3) signaling and/or physical layer (also referred to as a layer 1, Layer 1) signaling. A reference signal of the BM measurement includes only a reference signal of a serving cell. A measurement metric may include a physical layer (that is, a layer 1) beam level (Beam level), for example, reference signal received power (reference signal receive power, RSRP), reference signal received quality (reference signal receive quality, RSRQ), signal to interference plus noise ratio (signal interference noise radio, SINR), and the like. A manner of reporting a measurement result is that the terminal device encapsulates and reports the measurement result to the network device in a physical layer format.

In conclusion, the terminal device cannot implement inter-cell mobility management by using the BM. In addition, although the terminal device can implement inter-cell mobility management by using the RRM, a delay of reporting the measurement result of the RRM is long, and beam selection during inter-cell fast movement process cannot be implemented.

SUMMARY

This application provides a communication method and apparatus, and a device, to implement inter-cell mobility management. This further reduces an inter-cell moving delay of a terminal device, and facilitates beam selection in an inter-cell fast movement process.

According to a first aspect, this application provides a communication method, including: receiving a first message from a network device, where the first message indicates a terminal device to measure a reference signal of a first cell and report a configuration measurement result in a physical layer coding format, and the first cell includes at least one non-serving cell of a terminal device, or the first cell includes at least one serving cell and the at least one non-serving cell of the terminal device; and obtaining a measurement result of the first cell based on the first message, where the measurement result of the first cell is used by the terminal device to perform cell selection, cell reselection, or cell handover.

According to the communication method provided in the first aspect, the terminal device receives the first message from the network device. The first message may not only indicate the terminal device to measure the reference signal of the first cell, but also report the configuration measurement result in a physical layer (Layer 1) coding format. The first cell includes the at least one non-serving cell of the terminal device, or the first cell includes the at least one serving cell and the at least one non-serving cell of the terminal device. In this way, not only the terminal device can be activated to measure the reference signal of the first cell, but also the measurement result can be configured to be reported in the physical layer (Layer 1) coding format. This provides a basis for the terminal device to report the measurement result to the network device, so that the terminal device can report the measurement result of the first cell in the physical layer (Layer 1) coding format to the network device in a timely and fast manner. Therefore, not only inter-cell mobility management is implemented, but also an inter-cell moving delay of the terminal device is reduced and beam selection during inter-cell fast movement is facilitated.

In a possible design of the first aspect, the method further includes: receiving a second message from the network device, where the second message indicates the terminal device to report the measurement result of the first cell to the network device, so that the terminal device reports the measurement result of the first cell based on the second message, and a design is simple and convenient; or the first message indicates the terminal device to report the measurement result of the first cell to the network device, so that the terminal device reports the measurement result of the first cell based on the first message, thereby saving configuration instructions.

In a possible design of the first aspect, the method further includes: performing physical layer coding format processing on the measurement result of the first cell based on the first message, to obtain a measurement result of the first cell in the physical layer coding format; and reporting a third message to the network device, where the third message includes the measurement result of the first cell in the physical layer coding format.

In a possible design of the first aspect, the method further includes: receiving a fourth message from the network device, where the fourth message is obtained based on the measurement result of the first cell in the physical layer coding format, and the fourth message indicates the terminal device to perform cell selection, cell reselection, or cell handover; and performing cell selection, cell reselection, or cell handover based on the fourth message.

In a possible design of the first aspect, the method further includes performing cell selection, cell reselection, or cell handover based on the measurement result of the first cell.

In a possible design of the first aspect, the performing cell selection, cell reselection, or cell handover based on the measurement result of the first cell includes: obtaining a first threshold; and performing cell selection, cell reselection, or cell handover based on the measurement result of the first cell and the first threshold, to reduce repeated operations of cell selection, cell reselection, or cell handover performed by the terminal device, thereby reducing a loss of the terminal device, and mitigating a ping-pong effect to some extent.

In a possible design of the first aspect, the method further includes: receiving a fifth message from the network device, where the fifth message indicates a maximum quantity of first cells and/or a cell set of the first cells that are measured by the terminal device based on the first message, so that the terminal device can determine a cell range covered by the first cell.

In a possible design of the first aspect, the method further includes: sending a sixth message to the network device, where the sixth message indicates whether the terminal device has a capability of measuring the first cell, so that the network device determines the first message based on an actual situation and the capability of measuring the first cell of the terminal device.

In a possible design of the first aspect, the obtaining a measurement result of the first cell based on the first message includes: measuring the reference signal of the first cell based on a physical layer measurement metric, to obtain a measurement result of the first cell, to shorten measurement duration, further reduce the inter-cell moving delay, implement beam selection during inter-cell fast movement, and help improve performance in a high-speed movement scenario. In this way, service requirements of low latency and high reliability are met.

According to a second aspect, this application provides a communication method, including: determining a first message, where the first message indicates a terminal device to measure a reference signal of a first cell and report a configuration measurement result in a physical layer coding format, and the first cell includes at least one non-serving cell of a terminal device, or the first cell includes at least one serving cell and the at least one non-serving cell of the terminal device; and sending the first message to the terminal device.

According to the communication method provided in the second aspect, the network device determines the first message. The first message may not only indicate the terminal device to measure the reference signal of the first cell, but also report the configuration measurement result in a physical layer (Layer 1) coding format. The first cell includes the at least one non-serving cell of the terminal device, or the first cell includes the at least one serving cell and the at least one non-serving cell of the terminal device. The network device sends the first message to the terminal device. In this way, not only the terminal device can be activated to measure the reference signal of the first cell, but also the measurement result can be configured to be reported in the physical layer (Layer 1) coding format. This provides a basis for the terminal device to report the measurement result to the network device, so that the terminal device can report the measurement result of the first cell in the physical layer (Layer 1) coding format to the network device in a timely and fast manner. Therefore, not only inter-cell mobility management is implemented, but also an inter-cell moving delay of the terminal device is reduced and beam selection during inter-cell fast movement is facilitated.

In a possible design of the second aspect, the method further includes: sending a second message to the terminal device, where the second message indicates the terminal device to report the measurement result of the first cell to the network device, so that the terminal device reports the measurement result of the first cell based on the second message, and a design is simple and convenient; or the first message indicates the terminal device to report the measurement result of the first cell to the network device, so that the terminal device reports the measurement result of the first cell based on the first message, thereby saving configuration instructions.

In a possible design of the second aspect, the method further includes: receiving a third message from the terminal device, where the third message includes a measurement result of the first cell in the physical layer coding format, and the measurement result of the first cell in the physical layer coding format is obtained by the terminal device by performing physical layer coding format processing on the measurement result of the first cell based on the first message; and sending a fourth message to the terminal device, where the fourth message is obtained based on the measurement result of the first cell in the physical layer coding format, and the fourth message indicates the terminal device to perform cell selection, cell reselection, or cell handover.

In a possible design of the second aspect, the method further includes: sending a fifth message to the terminal device, where the fifth message indicates a maximum quantity of first cells and/or a cell set of the first cells that are measured by the terminal device based on the first message, so that the terminal device can determine a cell range covered by the first cell.

In a possible design of the second aspect, the determining a first message includes: receiving a sixth message from the terminal device, where the sixth message indicates whether the terminal device has a capability of measuring the first cell; and determining the first message based on the sixth message; or obtaining predefined information indicating whether the terminal device has the capability of measuring the first cell, and determining the first message based on the information.

In a possible design of the first aspect or the second aspect, the first message and the fifth message each include at least one of the following messages: radio resource control layer information, media access control layer control information, or physical layer dynamic control information.

In a possible design of the first aspect or the second aspect, information in the first message includes at least one of the following information:

first information, where the first information is used by the terminal device to measure the reference signal of the first cell;

second information, where the second information indicates the terminal device to invoke third information, and the third information is used to obtain the measurement result of the first cell; or fourth information, where the fourth information indicates the terminal device to invoke the measurement result of the first cell.

In a possible design of the first aspect or the second aspect, when the first message includes the first information, the first message or another message is further used to trigger the terminal device to measure the reference signal of the first cell based on the first information, to obtain the measurement result of the first cell. Alternatively, when the first message includes the second information, the first message or another message is further used to trigger the terminal device to invoke the third information based on the second information and measure the first cell based on the third information, to obtain the measurement result of the first cell. Alternatively, when the first message includes the fourth information, the first message or another message is further used to trigger the terminal device to invoke the measurement result of the first cell based on the fourth information. The another message is different from the first message.

In a possible design of the first aspect or the second aspect, the first message or the another message is further used to configure each reference signal in the third information to be at least one of periodic, semi-persistent, or aperiodic.

In a possible design of the first aspect or the second aspect, when the first message includes the first information, the first information specifically includes configuration information of the reference signal of the first cell, configuration information of a QCL relationship between the serving cell and the non-serving cell in the first cell, and configuration information of beam failure recovery management of the first cell.

In a possible design of the first aspect or the second aspect, the first message or the another message is further used to trigger the terminal device to report the measurement result of the first cell to the network device, or is further used to trigger the terminal device to report a measurement result of the non-serving cell in the first cell to the network device, or is further used to trigger the terminal device to report a measurement result of the serving cell in the first cell to the network device. The another message is different from the first message.

In a possible design of the first aspect or the second aspect, the first message or the another message is further used to configure a reporting manner of a measurement result.

In a possible design of the first aspect or the second aspect, the reporting manner is a manner of reporting after performing physical layer coding format processing on the measurement result of the first cell. Alternatively, the reporting manner is a manner of reporting after performing physical layer coding format processing on the measurement result of the first cell and indicated identification information corresponding to the measurement result of the first cell. Alternatively, the reporting manner is a manner of reporting after performing physical layer coding format processing on the measurement result of the first cell and identification information of a reference signal corresponding to the measurement result of the first cell. Alternatively, the reporting manner is a manner of reporting after performing physical layer coding format processing on the measurement result of the first cell, identification information of a reference signal corresponding to the measurement result of the first cell, and identification information of a cell corresponding to the measurement result of the first cell. Alternatively, the reporting manner is a manner of reporting after performing physical layer coding format processing on the measurement result of the non-serving cell in the first cell. Alternatively, the reporting manner is a manner of reporting after performing physical layer coding on the measurement result of the non-serving cell in the first cell and identification information of a cell corresponding to the measurement result of the non-serving cell in the first cell. Alternatively, the reporting manner is a manner of reporting after performing physical layer coding format processing on the measurement result of the non-serving cell in the first cell and identification information of a reference signal corresponding to the measurement result of the non-serving cell in the first cell. Alternatively the reporting manner is a manner of reporting after performing physical layer coding format processing on the measurement result of the non-serving cell in the first cell, identification information of a cell corresponding to the measurement result of the non-serving cell in the first cell, and identification information of a reference signal corresponding to the measurement result of the non-serving cell in the first cell. Alternatively, the reporting manner is a manner of reporting after performing physical layer coding format processing on the measurement result of the first cell, identification information of a cell corresponding to the measurement result of the non-serving cell in the first cell, and identification information of a reference signal corresponding to the measurement result of in the first cell.

In a possible design of the first aspect or the second aspect, the first message or the another message is further used to configure the terminal device to perform physical layer coding on identification information of one of a plurality of same cells.

In a possible design of the first aspect or the second aspect, the identification information of the cell includes a cell ID or other information, and the other information is mapped to the cell ID.

According to a third aspect, this application provides a communication apparatus. The apparatus may be a terminal device, or may be a chip in a terminal device. The apparatus may include a processing unit and a transceiver unit. When the apparatus is the terminal device, the processing unit may be a processor, and the transceiver unit may be a transceiver. The terminal device may further include a storage unit, and the storage unit may be a memory. The storage unit is configured to store instructions, and the processing unit executes the instructions stored in the storage unit, so that the terminal device performs a corresponding function in any one of the first aspect or the possible designs of the first aspect. When the apparatus is the chip in the terminal device, the processing unit may be a processor, and the transceiver unit may be an input/output interface, a pin, a circuit, or the like. The processing unit executes instruction stored in a storage unit, so that the terminal device performs the corresponding function in the first aspect and any possible design of the first aspect. The storage unit may be a storage unit (for example, a register or a cache) in a chip, or may be a storage unit (for example, a read-only memory or a random access memory) that is inside the terminal device and that is located outside the chip.

According to a fourth aspect, this application provides a communication apparatus. The apparatus may be a network device, or may be a chip in a network device. The apparatus may include a processing unit and a transceiver unit. When the apparatus is the network device, the processing unit may be a processor, and the transceiver unit may be a transceiver. The network device may further include a storage unit, and the storage unit may be a memory. The storage unit is configured to store instructions, and the processing unit executes the instructions stored in the storage unit, so that the network device performs a corresponding function in any one of the second aspect or the possible designs of the second aspect. When the apparatus is the chip in the network device, the processing unit may be a processor, and the transceiver unit may be an input/output interface, a pin, a circuit, or the like. The processing unit executes instruction stored in a storage unit, so that the network device performs the corresponding function in the second aspect and any possible design of the second aspect. The storage unit may be a storage unit (for example, a register or a cache) in a chip, or may be a storage unit (for example, a read-only memory or a random access memory) that is inside the network device and that is located outside the chip.

According to a fifth aspect, this application provides a readable storage medium. The readable storage medium stores executable instructions. When at least one processor of a terminal device executes the executable instructions, the terminal device performs the communication method in any one of the first aspect or the possible designs of the first aspect.

According to a sixth aspect, this application provides a readable storage medium. The readable storage medium stores executable instructions. When at least one processor of a network device executes the executable instructions, the network device performs the communication method in any one of the second aspect or the possible designs of the second aspect.

According to a seventh aspect, this application provides a program product. The program product includes an executable instruction, and the executable instruction is stored in a readable storage medium. The executable instructions are stored in a readable storage medium. At least one processor in a terminal device may read the executable instructions from the readable storage medium. The at least one processor executes the executable instructions, so that the terminal device performs the communication method in any one of the first aspect or the possible designs of the first aspect.

According to an eighth aspect, this application provides a program product. The program product includes executable instructions, and the executable instructions are stored in a readable storage medium. At least one processor in a network device may read the executable instructions from the readable storage medium. The at least one processor executes the executable instructions, so that the network device performs the communication method in any one of the second aspect or the possible designs of the second aspect.

DESCRIPTION OF EMBODIMENTS

Figure 1:
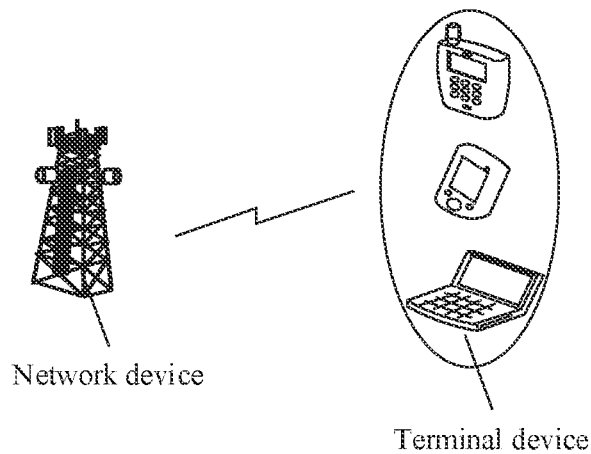
FIG. 1 is a schematic architectural diagram of a communication system.

In this application, at least one means one or more, and a plurality of means two or more. And/or describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one of a, b, or c may represent: a, b, c, a combination of a and b, a combination of a and c, a combination of b and c, or a combination of a, b and c, where each of a, b, and c may be in a singular form or a plural form. In addition, terms "first" and "second" are merely used for a purpose of description, and shall not be understood as an indication or implication of relative importance.

Embodiments of this application may be applied to a wireless communication system. It should be noted that, the wireless communication system in the embodiments of this application includes, but is not limited to: a narrowband Internet of things (NarrowBand-Internet of Things, NB-IoT) system, a global system for mobile communication (Global System for Mobile communication, GSM) system, an enhanced data rates for GSM evolution (Enhanced Data rates for GSM Evolution, EDGE) system, a wideband code division multiple access (Wideband Code Division Multiple Access, WCDMA) system, a code division multiple access 2000 (Code Division Multiple Access 2000, CDMA2000) system, a time division-synchronous code division multiple access (Time Division-Synchronous Code Division Multiple Access, TD-SCDMA) system, a long term evolution (Long Term Evolution, LTE) system, a fifth-generation (fifth-generation, 5G) mobile communication system, and a next generation communication system.

A communication apparatus related in this application mainly includes a network device and a terminal device.

Network device: The network device may be a base station, an access point, an access network device, or a device that is in an access network and that communicates with a wireless terminal through one or more sectors over an air interface. The network device may be configured to mutually convert a received over-the-air frame and an IP packet and serve as a router between the wireless terminal and a rest portion of the access network, where the rest portion of the access network may include an Internet protocol (IP) network. The network device may coordinate attribute management of the air interface. For example, the network device may be a base transceiver station (Base Transceiver Station, BTS) in a global system for mobile communication (Global System for Mobile communication, GSM) or code division multiple access (Code Division Multiple Access, CDMA), or may be a NodeB (NodeB, NB) in wideband code division multiple access (Wideband Code Division Multiple Access, WCDMA), or may be an evolved NodeB (Evolutional Node B, eNB or eNodeB) in long term evolution (Long Term Evolution, LTE), a relay node or an access point, a base station in a 5G network, for example, a gNB, or a next-generation network. This is not limited herein.

A terminal device may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a RAN. The wireless terminal may be a mobile terminal, for example, a mobile phone (or referred to as a "cellular" phone), or a computer with the mobile terminal, for example, a portable, pocket-sized, handheld, computer built-in, or vehicle-mounted mobile apparatus, which exchanges voice and/or data with the radio access network. For example, it may be a device such as a personal communication service (Personal Communication Service, PCS) phone, a cordless telephone set, a session initiation protocol (Session Initiation Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile terminal (Mobile), a remote station (Remote Station), a remote terminal (Remote Terminal), an access terminal (Access Terminal), a user terminal (User Terminal), a user agent (User Agent), a user device (User Device or User Equipment). The present invention is not limited thereto.

FIG. 1 is a schematic architectural diagram of a communication system. As shown in FIG. 1, the communication system in this application may include at least one network device and at least one terminal device, and the network device may communicate with the terminal device. In FIG. 1, one network device and a plurality of terminals are used as an example for description.

Three major application scenarios of 5G NR are enhanced mobile broadband (enhanced mobile broadband, eMBB), ultra-reliable low latency communication (ultra-reliable low latency communication, uRLLC), and massive machine type of communication (massive machine type of communication, mMTC). To meet the three major application scenarios of 5G NR, high frequency bands may be introduced to 5G NR to achieve a larger bandwidth and a higher transmission rate. Because a frequency is high, severe fading may occur during signal transmission in the space. Therefore, 5G NR uses a beamforming (beamforming, BF) technology to obtain a good directional gain, to increase directional power in a transmit direction and improve a signal to interference plus noise ratio (signal to interference plus noise radio, SINR) at a receive terminal, thereby improving system performance. In consideration of a tradeoff between costs and performance, a hybrid beamforming (hybrid beam forming, HBF) technology including digital beamforming and analog beamforming is usually used in 5G NR.

In addition, mobility management is an important part of wireless mobile communication, and can ensure that a communication link between a network device and a terminal device is not interrupted due to movement of the terminal device. In 5G NR, mobility management is mainly performed in an inter-cell (inter-cell mobility) manner and in an intra-cell (intra-cell mobility) manner, and measurement and reporting are main steps of mobility management. Usually, a specific measurement and reporting process may include: The network device performs measurement configuration and reporting configuration for the terminal device. The terminal device performs measurement on a corresponding configuration resource based on the measurement configuration of the network device. After the measurement, the measurement result is reported to the network device based on the reporting configuration of the network device, so that inter-cell handover and intra-cell handover are performed based on a measurement result.

Procedures of inter-cell and intra-cell measurement and reporting are different. Therefore, a protocol specifies that different frameworks are used to implement inter-cell and intra-cell mobility management. Radio resource management (radio resource measurement, RRM) is used for inter-cell mobility management, and beam management (beam management, BM) is used for intra-cell mobility management.

Figure 2:
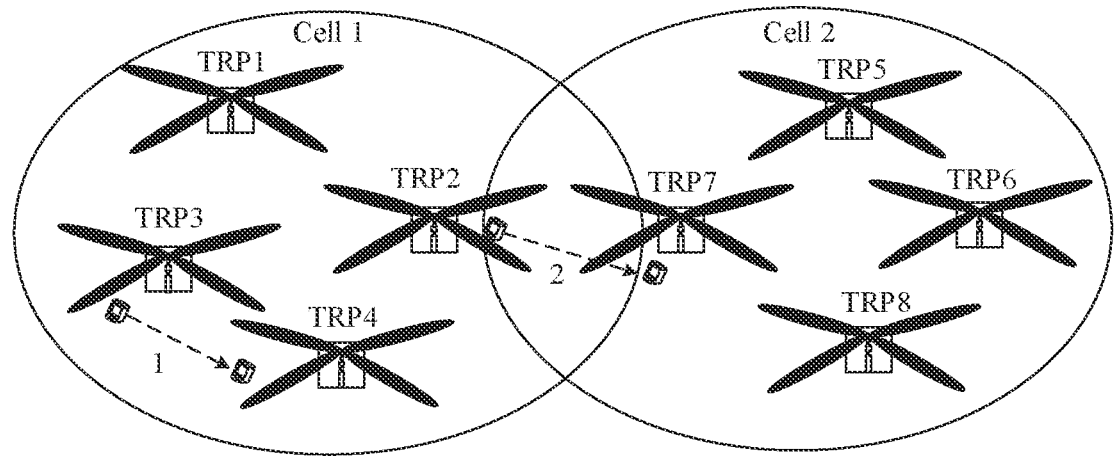
FIG. 2 is a schematic diagram of intra-cell movement and intra-cell movement of a terminal device.

With reference to FIG. 2, the following separately describes intra-cell mobility management and inter-cell mobility management by using examples. For ease of description, in FIG. 2, for example, a terminal device is a mobile phone. A path 1 and a path 2 are shown by using arrows. A cell 1 includes four transmission and reception points (transmission and reception point, TRP): a TRP 1, a TRP 2, a TRP 3, and a TRP 4. A cell 2 includes four TRPs: a TRP 5, a TRP 6, a TRP 7, and a TRP 8.

As shown in FIG. 2, if the terminal device moves from a location of the TRP 3 to a location of the TRP 4 on the path 1, the terminal device uses RRM to implement mobility management in the cell 1. If the terminal device moves from a location of the TRP 2 to a location of the TRP 7 on the path 2, the terminal device uses BM to implement mobility management between the cell 1 and the cell 2.

In addition, refer to FIG. 2. When the cell 1 and the cell 2 belong to a same set, mobility management between the cell 1 and the cell 2 may also be referred to as mobility management in the set. When the cell 1 and the cell 2 do not belong to a set, mobility management between the cell 1 and the cell 2 may also be referred to as mobility management between sets. The set herein may also be referred to as a cluster, a group, or the like.

The following describes a specific implementation in which the terminal device performs inter-cell mobility management by using RRM.

Usually, a network device notifies the terminal device of RRM measurement and reporting configuration information by using RRC layer signaling. The configuration information is used to configure a reference signal for RRM measurement, a type of the reference signal, a measurement metric, a measured cell, and the like. For the foregoing specific parameters, refer to the foregoing descriptions. Details are not described herein again. Therefore, the terminal device performs RRM measurement based on the configuration information. RRM measurement may be divided into two parts: physical layer (Layer-1) measurement and RRC layer (Layer-3) measurement. In a physical layer (Layer-1) measurement process, the terminal device measures, on a corresponding configuration resource, a reference signal corresponding to a configured measurement metric, to obtain a measurement result. A process of physical layer (Layer-1) measurement may be used as an intermediate step of RRC layer (Layer-3) measurement, and a measurement result thereof may be an intermediate result of RRC layer (Layer-3) measurement.

Then, for measurement based on an SSB, the terminal device may perform various running operations on a measurement result obtained on at least one SSB resource that has a same SSB index (index) and a same physical cell identifier (Physical Cell Identifier, PCI), such as obtaining a sum value, obtaining an average value, and selecting a maximum or minimum value, to obtain a beam (beam)-level physical layer (Layer 1) measurement result of an SSB resource corresponding to the SSB index (index) of a cell corresponding to a PCI, and report the measurement result to the RRC layer (Layer 3).

Then, for measurement based on a CSI-RS, the terminal device may perform various computation operations on a measurement result obtained on at least one CSI-RS resource that has a same CSI-RS resource identifier (resource identifier) and PCI, such as obtaining a sum value, obtaining an average value, and selecting a maximum or a minimum value, to obtain a beam (beam)-level physical layer (Layer 1) measurement result of a CSI-RS resource corresponding to the CSI-RS resource identifier of the cell corresponding to the PCI, and report the measurement result to the RRC layer (Layer 3).

After receiving the beam (beam)-level measurement result reported by the physical layer (Layer 1) at the RRC layer (Layer 3), the terminal device needs to perform a computation operation on a physical layer (Layer 1) measurement result of each beam (beam) in a same cell, to deduce the RRC layer (Layer 3) measurement result of the cell. Then, the terminal device further needs to perform an RRC layer (Layer 3) integration operation on an obtained cell-level RRC layer (Layer 3) measurement result.

The running operation may be understood as a filtering operation performed by the terminal device on a plurality of measurement results obtained in one measurement by using a physical layer (Layer 1) filter. The integration operation may be understood as a filtering operation performed by the terminal device on measurement results obtained in a plurality of times of measurement by using an RRC layer (Layer 3) filter.

In addition, based on the configuration information, the terminal device may also need to report the beam (beam)-level RRC layer (Layer 3) measurement result. In this case, the terminal device directly performs RRC layer (Layer 3) filtering on a physical layer (Layer 1) measurement result of each beam (beam), and then selects a to-be-reported measurement result from filtered measurement results for reporting.

Generally, a protocol specifies that the terminal device needs to verify a reporting trigger condition at least when a measurement result of a new cell is generated. When the reporting trigger condition is met, the terminal device needs to send a measurement report to the network device by using RRC layer encapsulation based on configuration information.

The configuration information is further used to configure a reporting criterion such as event triggering or periodic triggering, for example, a reporting format such as reporting a cell-level measurement metric or reporting a cell-level measurement metric and a beam (beam)-level measurement metric, a type of the measurement metric, and a quantity of reported cell-level measurement values, a quantity of reported beams (a beam-level measurement metric), and the like.

In conclusion, the foregoing content is an RRM framework. The terminal device performs RRM measurement based on measurement configuration and an indication of an RRC layer (Layer 3) instruction, and reports the measurement report to the network device based on reporting configuration of the RRC layer (Layer 3) through the RRC layer (Layer 3), so that the terminal device can implement inter-cell mobility management.

The following describes a specific implementation in which the terminal device performs intra-cell mobility management by using BM.

Generally, the network device notifies the terminal device of BM measurement configuration information by using RRC layer (layer 3) signaling and/or MAC layer (layer 2) signaling and/or physical layer (also referred to as layer 1, Layer 1) signaling. The configuration information is used to configure a reference signal, a measurement metric, and the like for BM measurement. For the foregoing specific parameters, refer to the foregoing descriptions. Details are not described herein again. Therefore, the terminal device performs BM measurement based on the configuration information, to obtain a measurement result.

In addition, the network device notifies the terminal device of configuration information of BM reporting by using RRC layer (layer 3) signaling and/or MAC layer (layer 2) signaling and/or physical layer (Layer 1) signaling. Therefore, when a reporting trigger condition is met, the terminal device needs to send a measurement report to the network device in a physical layer (Layer-1) coding format based on the configuration information.

The configuration information is used to configure a plurality of reporting configurations: periodic CSI-RS-based periodic reporting, periodic or semi-persistent CSI-RS-based semi-persistent reporting, periodic, semi-persistent or aperiodic CSI-RS-based aperiodic reporting, and the like.

When the configuration information is used to configure periodic reporting, the terminal device may perform measurement only based on a periodic CSI-RS resource, and the terminal device may send a measurement report to the network device on a physical uplink control channel (physical uplink control channel, PUCCH).

When the configuration information is used to configure semi-persistent reporting, the terminal device may perform measurement based on a periodic or semi-persistent CSI-RS resource, and the terminal device may send the measurement report to the network device on the PUCCH or a physical uplink shared channel (physical uplink share channel, PUSCH). When the network device sends a media access control layer (medium access control sub layer, MAC, MAC-CE) instruction (also referred to as a layer 2 (Layer 2), such as a MAC-customer edge (MAC-customer edge, MAC-CE) instruction) or downlink control information (downlink control information, DCI) to the terminal device, to activate/deactivate the terminal device to perform semi-persistent reporting. The terminal device may send the measurement report to the network device on the PUSCH.

When the configuration information is used to configure aperiodic reporting, the terminal device may perform measurement based on a periodic, semi-persistent, or aperiodic CSI-RS resource, and the terminal device may send the measurement report to the network device on the PUSCH.

In conclusion, the foregoing content is a BM framework. The terminal device performs BM measurement based on measurement configuration of an RRC layer (Layer 3) instruction and indications of MAC layer (Layer 2) and physical layer (Layer 1) instructions, and reports the measurement report to the network device based on reporting configuration of the RRC layer (Layer 3) through the physical layer (Layer 1), so that the terminal device can implement intra-cell mobility management.

Based on the foregoing description, because only related configuration of a serving cell is configured in the BM framework, and no related configuration of a non-serving cell is configured, and related configuration of the non-serving cell and the serving cell is configured in the RRC framework, the terminal device cannot implement inter-cell mobility management by using BM. In addition, although the terminal device may implement inter-cell mobility management by using RRM, because an RRM measurement result is reported through the RRC layer (Layer 3), an RRM reporting delay is long, and beam selection during inter-cell fast movement cannot be implemented.

To resolve the foregoing problem, this application provides a communication method and apparatus, a device, and a computer storage medium. A generated latency of reporting a measurement result through a physical layer (Layer 1) is far less than a latency of reporting the measurement result through an RRC layer (Layer 3). A terminal device may be configured to report the measurement result to a network device in a physical layer (Layer 1) coding format. In this way, inter-cell mobility latency is reduced, so that beam selection during inter-cell fast movement is implemented. This helps improve performance in high-speed mobility scenarios, thereby meeting a service requirement for low latency and high reliability.

Figure 3:
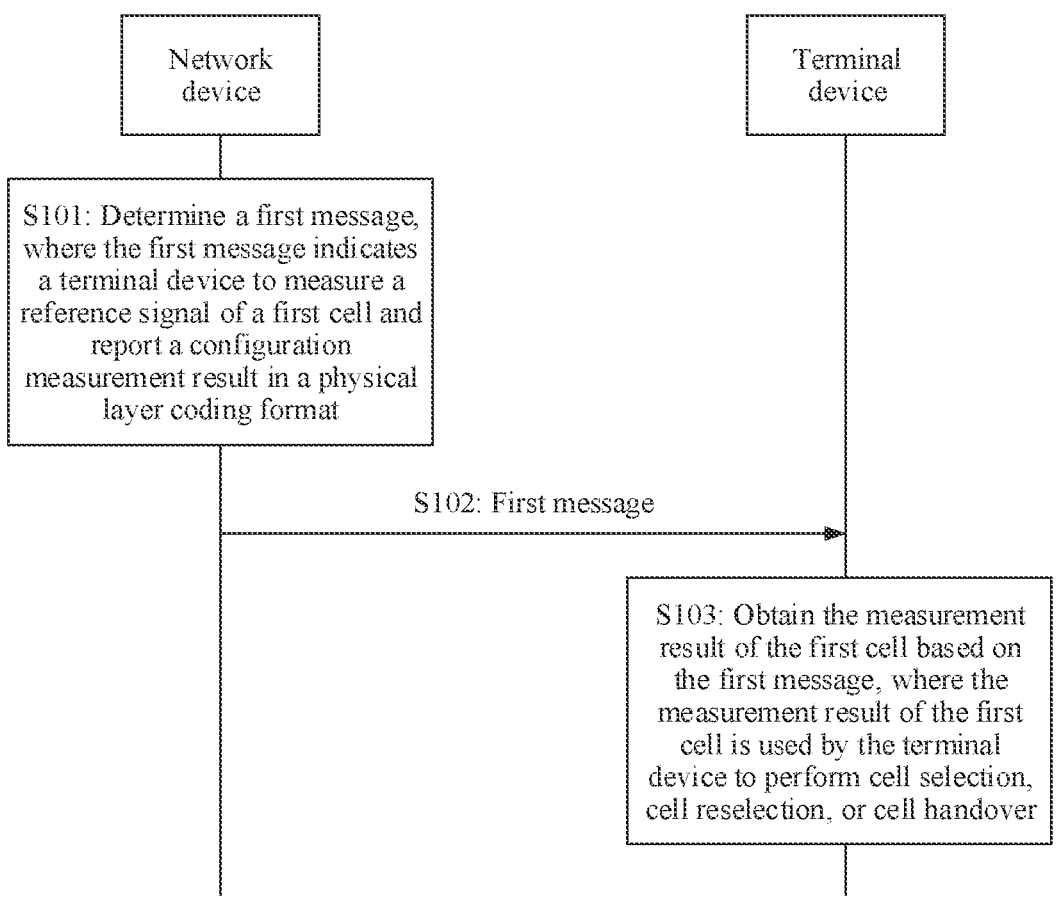
FIG. 3 is a signaling flowchart of a communication method according to an embodiment of this application.

The following describes in detail a specific process of performing the communication method by the terminal device and the network device in FIG. 1 in this application with reference to FIG. 3.

FIG. 3 is a signaling flowchart of a communication method according to an embodiment of this application. As shown in FIG. 3, the communication method in this application may include the following steps.

S101: A network device determines a first message, where the first message indicates a terminal device to measure a reference signal of a first cell and report a configuration measurement result in a physical layer coding format, and the first cell includes at least one non-serving cell of a terminal device, or the first cell includes at least one serving cell and the at least one non-serving cell of the terminal device. In this application, the network device may determine the first message. The first message may not only indicate the terminal device to measure the reference signal of the first cell, to activate the terminal device to measure the reference signal of the first cell, but also configure the measurement result to be reported in a physical layer (Layer 1) coding format. This provides a basis for the terminal device to report the measurement result to the network device, so that the terminal device can report the measurement result of the first cell in a physical layer (Layer 1) coding format to the network device in a timely and fast manner.

A quantity and a type of the first message are not limited in this application. Optionally, the first message may include at least one of RRC layer (Layer 3) information, MAC layer (Layer 2) control information, or physical layer (Layer 1) dynamic control information.

For example, the network device may determine one first message based on any one of the foregoing types of information, to activate, by using the first message, the terminal device to measure the reference signal of the first cell, and configure the measurement result to be reported in the physical layer (Layer 1) coding format. This helps reduce configuration instructions of the network device.

For another example, the network device may determine a plurality of first messages based on any plurality of types of information, to activate, by using some of the plurality of first messages, the terminal device to measure the reference signal of the first cell, and configure a measurement result for the remaining first messages and report the measurement result in the physical layer (Layer 1) coding format. A design is simple and convenient.

A specific indication form of the first message is not limited in this application either. For example, in this application, one or more information bits (bits) in the first message may be used to activate the terminal device to measure the reference signal of the first cell and configure the measurement result. The measurement result is reported in the physical layer (Layer 1) coding format. In addition, the physical layer (Layer 1) coding format is a format applicable to coding at the physical layer (Layer 1). This is not limited in this application.

In this application, the first cell may include a non-serving cell of one or more terminal devices. Alternatively, the first cell may include a serving cell of the one or more terminal devices and a non-serving cell of the one or more terminal devices. A cell type may include the serving cell and the non-serving cell.

The serving cell may include at least one primary cell (primary cell, PCell) and at least one secondary cell (secondary cell, SCell). The primary serving cell is a cell operating on a primary frequency band. The terminal device performs an initial connection establishment procedure or initiates a connection re-establishment procedure in the cell. In a handover process, the cell is indicated as a primary cell. A secondary serving cell is a cell operating on a secondary frequency band. Once an RRC connection is established, the secondary cell may be configured to provide additional radio resources. A cell other than the foregoing cells is a non-serving cell.

For a terminal device in an RRC connected mode, if carrier aggregation (carrier aggregation, CA) is not configured, the serving cell has only one primary serving cell. If CA is configured, the serving cell may include the primary cell and the secondary cell. In this way, the terminal device can implement cell handover. For a terminal device in an RRC idle mode (RRC_IDLE) or an RRC inactive mode (RRC_INACTIVE), the serving cell may also be understood as a cell corresponding to a system message (system information, SI) received by the terminal device, and another cell is the non-serving cell. It should be noted that a cell range covered by the first cell may be configured by the network device, or may be predefined in a protocol, or may be prestored in the terminal device. This is not limited in this application.

When the cell range covered by the first cell is predefined in the protocol or prestored in the terminal device, the terminal device may directly determine the cell range covered by the first cell. When the cell range covered by the first cell is configured by the network device, the network device may use a plurality of implementations, so that the terminal device can determine the cell range covered by the first cell.

Optionally, the network device may notify the terminal device by using the first message, so that the terminal device can determine, based on the first message, the cell range covered by the first cell, to save indication instructions.

The first message may be used to indicate some or all of non-serving cells of the terminal device, or may be used to indicate some or all of the non-serving cells of the terminal device and some or all of serving cells of the terminal device. This is not limited in this application.

Alternatively, the network device may notify the terminal device by using a fifth message, so that the terminal device can determine, based on the fifth message, a cell range covered by the first cell. A design is simple and convenient.

The fifth message may be used to indicate some or all of the non-serving cells of the terminal device, or may be used to indicate some or all of the non-serving cells of the terminal device and some or all of the serving cells of the terminal device. This is not limited in this application.

Alternatively, the network device may notify the terminal device by using the first message and the fifth message, so that the terminal device can determine, based on the first message and the fifth message, the cell range covered by the first cell, to cope with an unexpected case such as a temporary poor signal of the cell.

For example, the terminal device may determine, as the cell range covered by the first cell, an intersection set of a cell range determined based on the first message and a cell range determined based on the fifth message. Alternatively, the terminal device may determine, as the cell range covered by the first cell, a universal set of the cell range determined based on the first message and the cell range determined based on the fifth message. This is not limited in this application.

Specific implementations of the first message and the fifth message are not limited. Optionally, the first message and/or the fifth message may be used to indicate a maximum quantity of first cells that are measured by the terminal device based on the first message, may further be used to indicate a cell set of first cells that are measured by the terminal device based on the first message, and may further indicate a maximum quantity of the first cells and a cell set that are measured by the terminal device based on the first message. This is not limited in this application.

The network device may separately send the first message and the fifth message to the terminal device. A sequence of sending the first message and the fifth message is not limited. Alternatively, the network device may simultaneously send the first message and the fifth message to the terminal device. A quantity and a type of the fifth message are not limited in this application. Optionally, a type of the fifth message may include at least one of RRC layer (Layer 3) information, MAC layer (Layer 2) control information (such as a MAC-CE instruction), or physical layer (Layer 1) dynamic control information (such as DCI). In addition, a specific indication form of the fifth message is not limited in this application either. For example, in this application, the cell range covered by the first cell may be configured by using one or more information bits (bits) in the fifth message.

In addition, because measurement and reporting are main steps of mobility management, the network device may further configure related information for measuring the reference signal of the first cell by the terminal device, to configure inter-cell mobility management for the terminal device.

The network device may configure, in a plurality of implementations, the related information for measuring the reference signal of the first cell by the terminal device. Optionally, the network device may configure, by using the first message, the related information for measuring the reference signal of the first cell by the terminal device, or may configure, by using another message, the related information for measuring the reference signal of the first cell by the terminal device. Alternatively, the network device may configure, by using both the first message and the another message, the related information for measuring the reference signal of the first cell by the terminal device. This is not limited in this application.

For example, the first message not only may be used to activate the terminal device to measure the reference signal of the first cell and configure the measurement result to be reported in the physical layer (Layer 1) coding format, but also may be used to configure measurement-related information of the first cell, thereby reducing configuration instructions of the network device.

For another example, the first message may be used to activate the terminal device to measure the reference signal of the first cell and configure the measurement result to be reported in the physical layer (Layer 1) coding format, and the another message may be used to configure the measurement-related information of the first cell. A design is simple and convenient.

For another example, the first message may be used to activate the terminal device to measure the reference signal of the first cell and configure the measurement result to be reported in the physical layer (Layer 1) coding format, and the another message and the first message may be jointly used to configure the measurement related information of the first cell, to provide a possibility.

The network device may separately send the first message and the another message to the terminal device. A sequence of sending the first message and the another message is not limited. Alternatively, the network device may simultaneously send the first message and the another message to the terminal device. A quantity and a type of the another message are not limited in this application. The another message and the first message may be messages of a same type, or may be messages of different types. The quantity and the type of the another message are not limited in this application. Optionally, the another message may include at least one of RRC layer (Layer 3) information, MAC layer (Layer 2) control information, or physical layer (Layer 1) dynamic control information. In addition, a specific indication form of the another message is not limited in this application either. For example, in this application, the measurement related information of the first cell may be configured by using one or more information bits (bits) in the another message.

S102: The network device sends the first message to the terminal device.

S103: The terminal device obtains the measurement result of the first cell based on the first message, where the measurement result of the first cell is used by the terminal device to perform cell selection, cell reselection, or cell handover.

In this application, the network device may send the first message to the terminal device, to activate the terminal device to measure the reference signal of the first cell and configure the terminal device to report the measurement result in the physical layer (Layer 1) coding format. Further, the terminal device may obtain the measurement result of the first cell based on the first message.

A specific representation manner of the measurement result of the first cell is not limited in this application. In addition, the measurement result of the first cell may be used by the terminal device to perform cell selection, cell reselection, or cell handover. Generally, when the terminal device is in the RRC idle mode/the RRC inactive mode, the terminal device may implement cell selection or cell reselection based on the measurement result of the first cell. When the terminal device is in the RRC connected mode, the terminal device may implement cell handover based on the measurement result of the first cell.

Based on the foregoing content, a latency of reporting the measurement result through the physical layer (Layer 1) is less than a latency of reporting the measurement result through an RRC layer (Layer 3). In comparison with a case in which the terminal device performs inter-cell mobility management by using RRM, according to the communication method in this application, the terminal device may report the measurement result of the first cell in the physical layer (Layer 1) coding format to the network device in a timely and fast manner. This reduces an inter-cell moving delay of the terminal device, and facilitates beam selection during inter-cell fast movement.

According to the communication method provided in this application, the network device determines the first message. The first message may not only indicate the terminal device to measure the reference signal of the first cell, but also report the configuration measurement result in the physical layer (Layer 1) coding format. The first cell includes the at least one non-serving cell of the terminal device, or the first cell includes the at least one serving cell and the at least one non-serving cell of the terminal device. The network device sends the first message to the terminal device. In this way, not only the terminal device can be activated to measure the reference signal of the first cell, but also the measurement result can be configured to be reported in the physical layer (Layer 1) coding format. This provides a basis for the terminal device to report the measurement result to the network device, so that the terminal device can report the measurement result of the first cell in the physical layer (Layer 1) coding format to the network device in a timely and fast manner. Therefore, not only inter-cell mobility management is implemented, but also an inter-cell moving delay of the terminal device is reduced and beam selection during inter-cell fast movement is facilitated.

A person skilled in the art may understand that, in a BM framework, the terminal device performs BM measurement based on a physical layer (Layer 1) measurement metric. In an RRM framework, the terminal device performs RRM measurement based on the physical layer (Layer 1) measurement metric and an RRC layer (Layer 3) measurement metric. Duration of measurement based on the RRC layer (Layer 3) measurement metric is far longer than duration of measurement based on the physical layer (Layer 1) measurement metric. The measurement metric may be understood as a performance indicator for measuring the reference signal, for example, RSRP, RSRQ, or an SINR.

Based on this, in this application, the terminal device may measure the reference signal of the first cell based on the physical layer (Layer 1) measurement metric, to shorten measurement duration, further reduce an inter-cell movement delay, and implement beam selection during inter-cell fast movement, thereby helping improve performance in a high-speed movement scenario. In this way, service requirements of low latency and high reliability are met.

The operation of measuring, by the terminal device, the reference signal of the first cell based on the physical layer (Layer 1) measurement metric may be configured by the network device, for example, indicated by using the first message or the another message, or may be defined by a protocol, or may be selected by the terminal device. This is not limited in this application.

Figure 4:
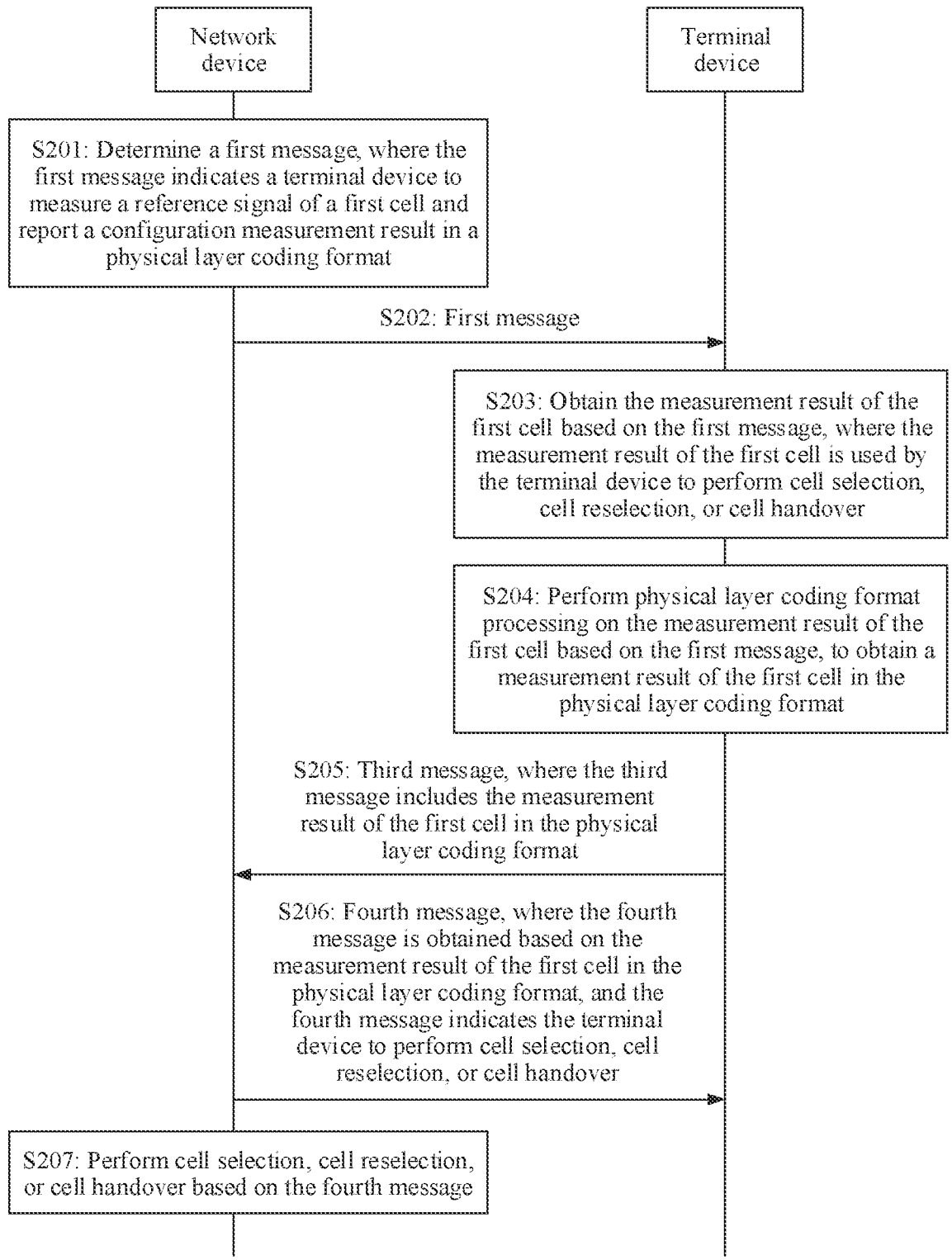
FIG. 4 is a signaling flowchart of a communication method according to an embodiment of this application.
Figure 5:
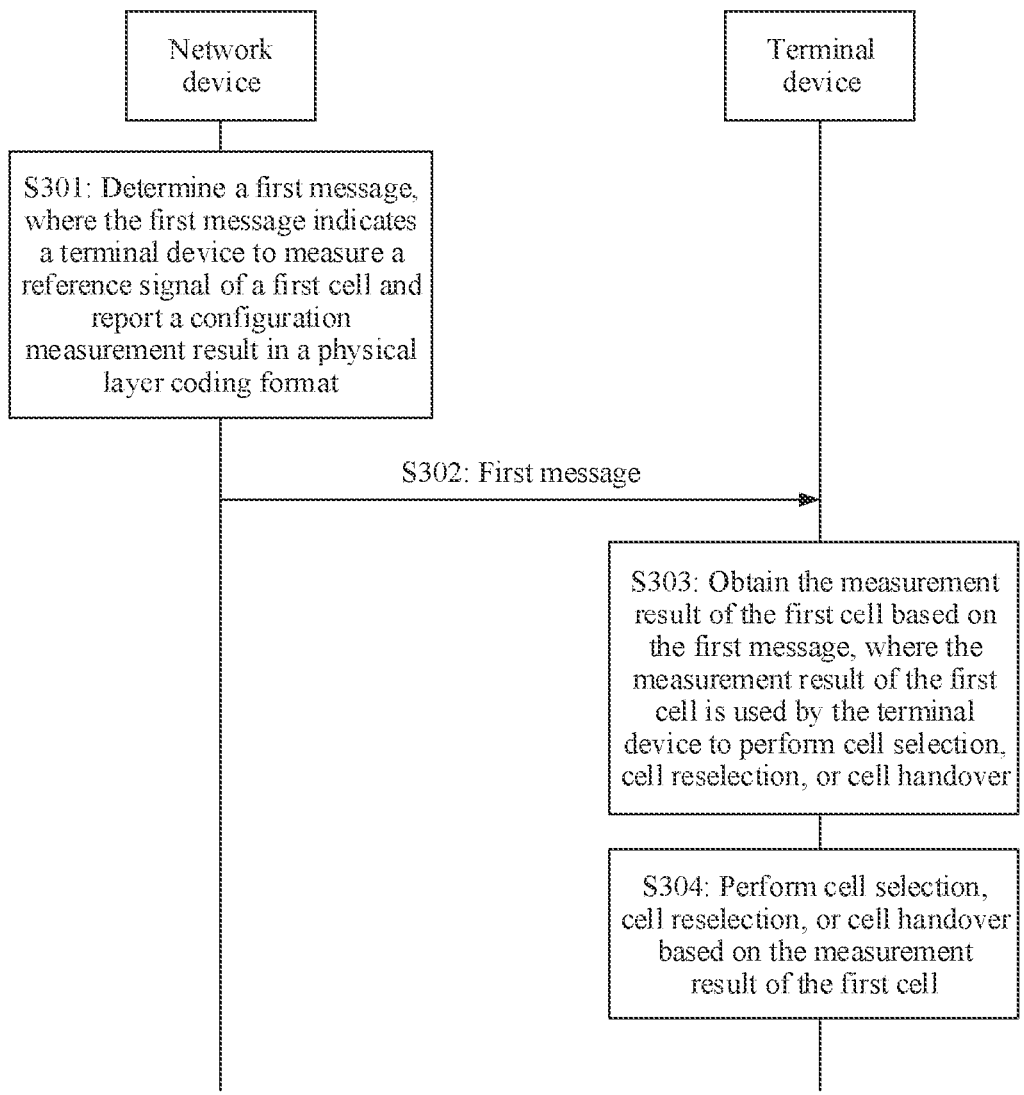
FIG. 5 is a signaling flowchart of a communication method according to an embodiment of this application.

Based on the foregoing descriptions, the terminal device may implement cell selection, cell reselection, or cell handover in a plurality of implementations. With reference to FIG. 4 and FIG. 5, the following uses Embodiment 1 and Embodiment 2 as examples to describe a specific implementation process of implementing cell selection, cell reselection, or cell handover by a terminal device in this application.

In Embodiment 1, the terminal device may implement cell selection, cell reselection, or cell handover based on determining performed by a network device. In Embodiment 2, the terminal device performs determining based on a measurement result of a first cell, to implement cell selection, cell reselection, or cell handover.

Embodiment 1

FIG. 4 is a signaling flowchart of a communication method according to an embodiment of this application. As shown in FIG. 4, the communication method in this application may include the following steps.

S201: A network device determines a first message, where the first message indicates a terminal device to measure a reference signal of a first cell and report a configuration measurement result in a physical layer coding format, and the first cell includes at least one non-serving cell of a terminal device, or the first cell includes at least one serving cell and the at least one non-serving cell of the terminal device.

S202: The network device sends the first message to the terminal device.

S203: The terminal device obtains the measurement result of the first cell based on the first message, where the measurement result of the first cell is used by the terminal device to perform cell selection, cell reselection, or cell handover.

Implementations of S201, S202, and S203 are respectively similar to those of S101, S102, and S103 in the embodiment shown in FIG. 3. Details are not described herein again in this application.

S204: The terminal device performs physical layer coding format processing on the measurement result of the first cell based on the first message, to obtain a measurement result of the first cell in the physical layer coding format.

Because the first message is used to configure that the measurement result is reported in the physical layer (Layer 1) coding format, the terminal device may perform processing of the physical layer (Layer 1) coding format on the measurement result of the first cell based on the first message, to obtain the measurement result of the first cell in the physical layer coding format.

The terminal device may report the measurement result of the first cell to the network device after receiving an indication sent by the network device. The following describes the specific implementation process with reference to two specific implementations.

In a feasible implementation, the network device may send a second message to the terminal device, where the second message indicates the terminal device to report the measurement result of the first cell to the network device, so that the terminal device reports the measurement result of the first cell based on the second message. A design is simple and convenient.

In another feasible implementation, the network device may notify the terminal device by using the first message, where the first message indicates the terminal device to report the measurement result of the first cell to the network device, so that the terminal device reports the measurement result of the first cell based on the first message, thereby saving configuration instructions.

S205: The terminal device reports a third message to the network device, where the third message includes the measurement result of the first cell in the physical layer coding format.

In this application, the terminal device may include the measurement result of the first cell in the physical layer coding format in the third message, so that the terminal device may send the third message to the network device. Parameters such as a type and a quantity of third messages are not limited in this application. Optionally, a type of the third message may include at least one of RRC layer (Layer 3) information, MAC layer (Layer 2) control information, or physical layer (Layer 1) dynamic control information. In addition, a specific indication form of the third message is not limited in this application either. For example, in this application, the measurement result of the first cell in the physical layer coding format may be configured by using one or more information bits (bits) in the third message.

S206: The network device sends a fourth message to the terminal device, where the fourth message is obtained based on the measurement result of the first cell in the physical layer coding format, and the fourth message indicates the terminal device to perform cell selection, cell reselection, or cell handover.

In this application, the network device may obtain the measurement result of the first cell in the physical layer coding format from the received third message, and obtain the fourth message based on the measurement result of the first cell in the physical layer coding format. The fourth message indicates the terminal device to perform cell selection, cell reselection, or cell handover.

Parameters such as a type and a quantity of fourth messages are not limited in this application. Optionally, a type of the fourth message may include at least one of RRC layer (Layer 3) information, MAC layer (Layer 2) control information, or physical layer (Layer 1) dynamic control information. In addition, a specific indication form of the fourth message is not limited in this application either. For example, in this application, one or more information bits (bits) in the fourth message may be used to indicate the terminal device to perform cell selection, cell reselection, or cell handover.

S207: The terminal device performs cell selection, cell reselection, or cell handover based on the fourth message.

Because the fourth message may be used to indicate the terminal device to perform cell selection, cell reselection, or cell handover, the terminal device may perform cell selection, cell reselection, or cell handover based on the received fourth message. For example, when the fourth message indicates the terminal device to perform cell selection, the terminal device performs cell selection. When the fourth message indicates the terminal device to perform cell reselection, the terminal device performs cell reselection. When the fourth message indicates the terminal device to perform cell handover, the terminal device performs cell handover.

In addition, the fourth message may be further used to indicate a cell corresponding to cell selection, cell reselection, or cell handover performed by the terminal device. For example, the fourth message includes identification information of the cell, so that the terminal device selects the cell corresponding to the identification information, to implement cell selection, cell reselection, or cell handover.

Embodiment 2

FIG. 5 is a signaling flowchart of a communication method according to an embodiment of this application. As shown in FIG. 5, the communication method in this application may include the following steps.

S301: A network device determines a first message, where the first message indicates a terminal device to measure a reference signal of a first cell and report a configuration measurement result in a physical layer coding format, and the first cell includes at least one non-serving cell of a terminal device, or the first cell includes at least one serving cell and the at least one non-serving cell of the terminal device.

S302: The network device sends the first message to the terminal device.

S303: The terminal device obtains the measurement result of the first cell based on the first message, where the measurement result of the first cell is used by the terminal device to perform cell selection, cell reselection, or cell handover.

Implementations of S301, S302, and S303 are respectively similar to those of S101, S102, and S103 in the embodiment shown in FIG. 3. Details are not described herein again in this application.

S304: The terminal device performs cell selection, cell reselection, or cell handover based on the measurement result of the first cell.

Because the measurement result of the first cell can indicate a performance indicator of the first cell, the terminal device may perform cell selection, cell reselection, or cell handover based on the measurement result of the first cell, and does not need to obtain, through the network device, information for performing the cell selection, the cell reselection, or the cell handover. Operations are simple and convenient, and signaling overheads are reduced.

Considering that the measurement result of the first cell may fluctuate greatly, optionally, the terminal device may obtain a first threshold. In addition, cell selection, cell reselection, or cell handover is performed based on the measurement result of the first cell and the first threshold, to reduce repeated operations of cell selection, cell reselection, or cell handover performed by the terminal device, thereby reducing a loss of the terminal device, and mitigating a ping-pong effect to some extent.

For example, the terminal device may compare a difference between a measurement result of the non-serving cell and a measurement result of the serving cell with the first threshold based on the measurement result of the first cell. If the difference is greater than the first threshold, the terminal device performs cell selection, cell reselection, or cell handover. If the difference is less than or equal to the first threshold, the terminal device does not perform cell selection, cell reselection, or cell handover.

The first threshold may be configured by the network device, or may be defined in a protocol, or may be prestored in the terminal device. This is not limited in this application. When the first threshold is predefined in the protocol or prestored in the terminal device, the terminal device may directly determine the first threshold. When the first threshold is configured by the network device, the network device may use a plurality of implementations, so that the terminal device can determine the first threshold.

Optionally, the network device may notify the terminal device by using the first message, so that the terminal device can determine the first threshold based on the first message, to save indication instructions.

Alternatively, the network device may notify the terminal device by using another message, so that the terminal device can determine the first threshold based on the another message. A design is simple and convenient.

Alternatively, the network device may notify the terminal device by using the first message and the another message, so that the terminal device can determine the first threshold based on the first message and the another message, to cope with an unexpected case in which the first threshold changes temporarily.

In conclusion, the terminal device implements inter-cell mobility management regardless of Embodiment 1 or Embodiment 2. It should be noted that the terminal device may perform the steps in Embodiment 1, or may perform the steps in Embodiment 2, or may perform the steps in Embodiment 1 and Embodiment 2. This is not limited in this application.

Based on the foregoing description, the network device may implement, in a plurality of implementations, the process in which the network device determines the first message in S101.

In a feasible implementation, the terminal device may send a sixth message to the network device, where the sixth message indicates whether the terminal device has a capability of measuring the first cell, so that the network device may learn, based on the sixth message, whether the terminal device has the capability of measuring the first cell. Therefore, the network device determines the first message based on an actual situation and the capability of the terminal device for measuring the first cell.

Parameters such as a type and a quantity of sixth messages are not limited in this application. Optionally, a type of the sixth message may include at least one of RRC layer (Layer 3) information, MAC layer (Layer 2) control information, or physical layer (Layer 1) dynamic control information. In addition, a specific indication form of the sixth message is not limited in this application either. For example, in this application, one or more information bits (bits) in the sixth message may be used to indicate whether the terminal device has the capability of measuring the first cell.

In another feasible implementation, the network device may obtain, with reference to an actual status of network access of the device, predefined information indicating whether the terminal device has the capability of measuring the first cell, so that the network device determines the first message with reference to the actual status and based on the information.

Based on the foregoing description, information in the first message may include a plurality of representation forms, and is used to obtain the measurement result of the first cell. The following describes a representation form of the information in the first message by using an example.

In a feasible representation form, the information in the first message may include first information, and the first information is used by the terminal device to measure the reference signal of the first cell. In other words, the terminal device may measure the reference signal of the first cell based on the first information, to obtain the measurement result of the first cell.

Optionally, when the first message includes the first information, the network device may further trigger/activate, by using the first message and/or the another message, the terminal device to perform the following process: The terminal device measures the reference signal of the first cell based on the first information, to obtain the measurement result of the first cell. Alternatively, the terminal device measures the reference signal of the first cell based on the first information and a physical layer (Layer 1) measurement metric, to obtain the measurement result of the first cell.

The first information may be a software program executed by the terminal device to measure the reference signal of the first cell, and specific content of the first information is not limited in this application. Optionally, the first information may specifically include configuration information of the reference signal of the first cell, configuration information of a QCL relationship between the serving cell and the non-serving cell in the first cell, and configuration information of beam failure recovery management of the first cell. In addition, the configuration information of the QCL relationship between the serving cell and the non-serving cell in the first cell and the configuration information of beam failure recovery management of the first cell may be further used for another function such as data transmission. Details are not described herein.

In another feasible representation form, the information in the first message may include second information, the second information indicates the terminal device to invoke third information, and the third information is used to obtain the measurement result of the first cell. In other words, the terminal device may invoke, indicated by the second information, the third information, to obtain the measurement result of the first cell.

The second information may be a corresponding software instruction for indicating the terminal device to invoke the third information. The third information may be an RRM software program in the conventional technology or a software program executed by the terminal device to measure the reference signal of the first cell.

Optionally, when the first message includes the second information, the network device may further trigger/activate, by using the first message and/or the another message, the terminal device to perform the following process: The terminal device may invoke the third information based on the second information, and measure the reference signal of the first cell based on the third information, to obtain the measurement result of the first cell. Alternatively, the terminal device may invoke the third information based on the second information, and measure the reference signal of the first cell based on the third information and the physical layer (Layer 1) measurement metric, to obtain the measurement result of the first cell.

In another feasible representation form, the information in the first message may include fourth information, and the fourth information indicates the terminal device to invoke the measurement result of the first cell. In other words, the terminal device may invoke, indicated by the fourth information, the measurement result of the first cell.

The fourth information may be a corresponding software instruction for indicating the terminal device to obtain the measurement result of the first cell. The measurement result of the first cell may be obtained by an RRM software program in the conventional technology or a software program executed by the terminal device to measure the reference signal of the first cell. This is not limited in this application.

Optionally, when the first message includes the fourth information, the network device may further trigger/activate, by using the first message and/or the another message, the terminal device to perform the following process: The terminal device may invoke and directly obtain the measurement result of the first cell based on the fourth information.

It should be noted that, in addition to the foregoing representation forms, the first message may further use any combination of the foregoing representation forms. In addition, the first message may alternatively be used only to indicate the terminal device to measure the reference signal of the first cell, to be used for an indication/activation/triggering, so that the measurement result of the first cell that is obtained by measuring the reference signal of the first cell based on the third information may be transmitted to the terminal device through a configured interface, and the terminal device obtains the measurement result of the first cell through the configured interface based on the first message. In addition, in addition to a manner in which the network device performs configuration, any process of triggering/activating the terminal device to perform may also be defined in a protocol or preconfigured on the terminal device.

The another message is different from the first message, and for a specific implementation of the another message, refer to the foregoing content. Details are not described herein again. In addition, the network device may further configure, by using the first message or the another message, each reference signal in the third information as at least one of periodic, semi-persistent, or aperiodic reference signals, so that the communication method in this application is applicable to various kinds of or types of reference signals.

To reduce signaling overheads, in this application, the network device may alternatively trigger, by using the first message or the another message, the terminal device to report the measurement result of the first cell, or the measurement result of the non-serving cell in the first cell, or the measurement result of the serving cell in the first cell to the network device. This is not limited in this application.

To standardize a reporting format of the terminal device, in this application, the network device may alternatively configure a reporting manner of the measurement result by using the first message or the another message. A specific implementation of the reporting manner is not limited in this application.

Optionally, the reporting manner is a manner of reporting after performing physical layer coding format processing on the measurement result of the first cell.

Alternatively, the reporting manner is a manner of reporting after performing physical layer coding format processing on the measurement result of the first cell and indicated identification information corresponding to the measurement result of the first cell.

Alternatively, the reporting manner is a manner of reporting after performing physical layer coding format processing on the measurement result of the first cell and identification information of a reference signal corresponding to the measurement result of the first cell.

Alternatively, the reporting manner is a manner of reporting after performing physical layer coding format processing on the measurement result of the first cell, identification information of a reference signal corresponding to the measurement result of the first cell, and identification information of a cell corresponding to the measurement result of the first cell.

Alternatively, the reporting manner is a manner of reporting after performing physical layer coding format processing on the measurement result of the non-serving cell in the first cell.

Alternatively, the reporting manner is a manner of reporting after performing physical layer coding on the measurement result of the non-serving cell in the first cell and identification information of a cell corresponding to the measurement result of the non-serving cell in the first cell.

Alternatively, the reporting manner is a manner of reporting after performing physical layer coding format processing on the measurement result of the non-serving cell in the first cell and identification information of a reference signal corresponding to the measurement result of the non-serving cell in the first cell.

Alternatively the reporting manner is a manner of reporting after performing physical layer coding format processing on the measurement result of the non-serving cell in the first cell, identification information of a cell corresponding to the measurement result of the non-serving cell in the first cell, and identification information of a reference signal corresponding to the measurement result of the non-serving cell in the first cell.

Alternatively, the reporting manner is a manner of reporting after performing physical layer coding format processing on the measurement result of the first cell, identification information of a cell corresponding to the measurement result of the non-serving cell in the first cell, and identification information of a reference signal corresponding to the measurement result of in the first cell.

It should be noted that, in addition to the manner in which the network device performs configuration, the manner in which the configuration measurement result is reported may also be defined in a protocol or preconfigured on the terminal device.

To reduce signaling overheads, in this application, the network device may alternatively configure, by using the first message or the another message, the terminal device to perform physical layer coding on identification information of one of a plurality of same cells, namely, identification information of a same cell. The terminal device reports identification information of the cell in the physical layer coding format to the network device once.

A specific implementation of the identification information of the cell is not limited in this application. Optionally, the identification information of the cell includes a cell ID or other information, and the other information is mapped to the cell ID. The cell ID may include but is not limited to a serial number, a PCI, or an identifier in another form. Because there are a large quantity of cells, a value corresponding to the cell ID is very large. When the terminal device reports a cell ID with a large value to the network device, the cell ID may occupy a plurality of information bits. Therefore, the terminal device may alternatively represent the identification information of the cell based on other information mapped to the cell ID, to reduce signaling overheads.

It should be noted that, in addition to performing configuration by the network device, the terminal device may perform physical layer coding on the identification information of the one of the plurality of same cells, or may be defined in the protocol or preconfigured on the terminal device.

In addition, the terminal device may usually report, to the network device in a form of a table, a report, or the like, the measurement result of the first cell on which physical layer coding is performed. In addition, when reporting the measurement result, the terminal device may further report parameters such as an index (index) of the cell, identification information of the cell, a measurement metric, and a reference signal to the terminal device. The following uses a table form as an example to describe how the terminal device reports the measurement result of the first cell on which physical layer coding is performed to the network device.

In a specific embodiment, if the first cell includes only a non-serving cell of at least one terminal device, the non-serving cell includes a cell 1, a cell 2, a cell 3, and a cell 4. In this case, the terminal device may report the measurement result of the first cell using physical layer coding to the network device in a form shown in Table 1 or Table 2.

TABLE 1

| Index (index) of a cell | PCI of a cell | SSB RI/CRI | Reported value (value) |
|---|---|---|---|
| 1 | Cell ID 01 | #xx1 | Absolute value (absolute) |
| 2 | Cell ID 15 | #xx2 | Differential (differential) 1 |
| 3 | Cell ID 15 | #xx3 | Differential (differential) 2 |
| 4 | Cell ID 68 | #xx4 | Differential (differential) 3 |

TABLE 2

| Index (index) of a cell | PCI of a cell | SSB RI/CRI | Reported value (value) |
|---|---|---|---|
| 1 | Cell ID 01 | #xx1 | Absolute value (absolute) |
| 2 | Cell ID 15 | #xx2 | Differential (differential) 1 |
|  |  | #xx3 | Differential (differential) 2 |
| 3 | Cell ID 68 | #xx4 | Differential (differential) 3 |

In Table 1 and Table 2, the measurement result of the first cell obtained by using physical layer coding includes: an index (index) of a cell, identification information (for example, a PCI) of a cell, a reference signal resource indicator (for example, a synchronization signal block resource indicator (synchronization signal block resource indicator, SSB RI) or a channel state information reference signal resource indicator (CSI-RS resource indicator, CRI)), and a reported value (that is, a measurement result).

A difference between Table 1 and Table 2 lies in that: Table 1 shows two indexes (index) and two PCIs of the cell 2, while Table 2 shows one index (index) and one PCI of the cell 2. In another specific embodiment, if the first cell includes a non-serving cell of at least one terminal device and a serving cell of at least one terminal device, the serving cell includes a cell 0, and the non-serving cell includes the cell 1, the cell 2, the cell 3, and the cell 4. In this case, the terminal device may report the measurement result of the first cell using physical layer coding to the network device in a form shown in Table 3 or Table 4.

TABLE 3

| Index (index) of a cell | PCI of a cell | SSB RI/CRI | Reported value (value) |
|---|---|---|---|
| 0 | / | #xx0 | Absolute value (absolute) |
| 1 | Cell ID 01 | #xx1 | Differential (differential) 1 |
| 2 | Cell ID 15 | #xx2 | Differential (differential) 2 |
| 3 | Cell ID 15 | #xx3 | Differential (differential) 3 |
| 4 | Cell ID 68 | #xx4 | Differential (differential) 4 |

TABLE 4

| Index (index) of a cell | PCI of a cell | SSB RI/CRI | Reported value (value) |
|---|---|---|---|
| 0 | / | #xx0 | Absolute value (absolute) |
| 1 | Cell ID 01 | #xx | Differential (differential) 1 |
| 2 | Cell ID 15 | #xx | Differential (differential) 2 |
|  |  | #xx | Differential (differential) 3 |
| 3 | Cell ID 68 | #xx | Differential (differential) 4 |

In Table 3 and Table 4, the measurement result of the first cell obtained by using physical layer coding includes: an index (index) of a cell, identification information (such as a PCI) of a cell, a resource indication (such as an SSB RI/CRI) of a reference signal, and a reported value (value).

A difference between Table 1 and Table 2 lies in that: Table 3 shows two indexes (index) and two PCIs of the cell 2, while Table 4 shows one index (index) and one PCI of the cell 2.

The reported value may be reported in an absolute value (absolute) manner and a differential value (differential) manner. A specific reporting manner is: Any reported value is selected as an absolute value for reporting, and other reported values are reported by taking the absolute value as a reference and taking a differential value for reporting. In this way, a dynamic range of the reported value may be narrowed down, and a number of coded bits may be reduced, thereby reducing signaling overheads. Certainly, the reported value may also be reported in the absolute value reporting manner. A specific reporting manner is: Report an absolute value of any reported value. In addition, the reported value may also be reported in the differential value reporting manner. A specific reporting manner is: Take a preset absolute value as a reference, and report differential values of all reported values. The preset absolute value may be configured by the network device, or may be defined in a protocol. This is not limited in this application.

In addition, to reduce overheads of the identification information of the cell, in this application, the identification information of the cell may be represented by using other information mapped to the cell ID. For example, a cell ID 01 is mapped to a number 1, a cell ID 15 is mapped to a number 2, and a cell ID 68 is mapped to a number 3. A mapping relationship may be configured by the network device, or may be defined in a protocol. This is not limited in this application, and it only needs to be met that the mapping relationship corresponding to converting the cell ID into the other information by the terminal device and the mapping relationship corresponding to converting the other information into the cell ID by the network device are the same.

Based on the foregoing content, considering that in a process in which the terminal device uses BM to implement intra-cell mobility management, the terminal device performs BM measurement based on a physical layer (Layer 1) measurement metric, and reports a measurement report to the network device through the physical layer (Layer 1).

Therefore, in this application, a BM framework can be properly used, based on configuration of measuring the reference signal of the first cell based on the physical layer (Layer 1) measurement metric, and configuration of reporting the measurement result in the physical layer coding format, a function of obtaining the measurement result of the first cell is further added on the basis of a BM framework. In this way, inter-cell mobility management can be implemented.

In one aspect, because the information in the first message may be used to obtain the measurement result of the first cell, in this application, the information in the first message may be added to the BM framework, and the measurement result configured in the BM framework is reported to the network device through the physical layer (Layer 1). Therefore, the communication method in this application is implemented, and configuration instructions are reduced.

When the information in the first message includes the first information, the first information is added to the BM framework, so that the terminal device implements inter-cell mobility management by using the BM framework to which the first information is added. Specifically, the terminal device measures the reference signal of the first cell based on the first information and the physical layer (Layer 1) measurement metric, to obtain the measurement result of the first cell, and configures, based on the BM framework, the measurement result of the first cell to be reported in the physical layer (Layer 1) coding format.

When the information in the first message includes the second first information, the second information is added to the BM framework, so that the terminal device implements inter-cell mobility management by using the BM framework to which the second information is added. Specifically, the terminal device invokes the third information (for example, an RRM framework) based on the second information, and measures the reference signal of the first cell based on the third information and based on the physical layer (Layer 1) measurement metric, to obtain the measurement result of the first cell, and configures, based on the BM framework, the measurement result of the first cell to be reported in the physical layer (Layer 1) coding format.

When the information in the first message includes the fourth first information, the fourth information is added to the BM framework, so that the terminal device implements inter-cell mobility management by using the BM framework to which the fourth information is added. Specifically, the terminal device invokes the measurement result of the first cell from the RRM framework based on the fourth information, and configures, based on the BM framework, to report the measurement result in the physical layer (Layer 1) coding format.

In another aspect, in this application, an interface connected to the BM framework may be further configured in the RRM framework, so that the measurement result of the first cell that is obtained based on the RRM framework can be transmitted to the BM framework through the interface, and the terminal device can obtain the measurement result of the first cell from the BM framework.

In addition, in this application, the identification information of the cell in the RRM framework may be further added to the BM framework. A cell corresponding to the identification information of the cell in the RRM framework includes the first cell, and the cell corresponding to the identification information of the cell in the RRM framework limits a quantity of cells that are added to the BM framework. In this application, a related configuration of the cell corresponding to the identification information of the cell in the RRM framework can be fully used, so that the terminal device can implement inter-cell mobility management in the BM framework without adding additional configuration information, thereby reducing configuration instructions and unnecessary consumption.

Figure 6:
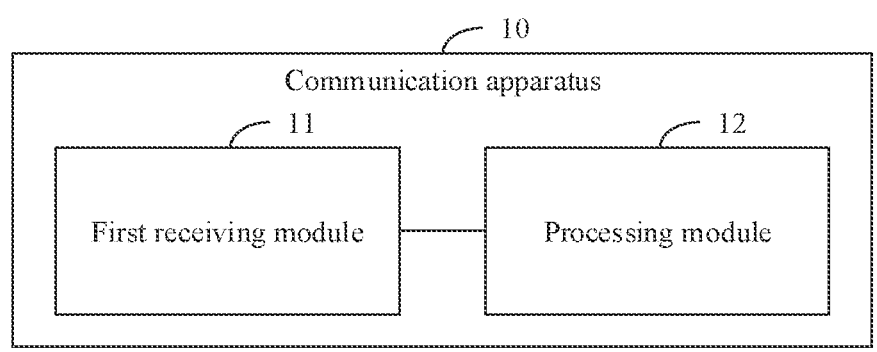
FIG. 6 is a schematic diagram of a structure of a communication apparatus according to an embodiment of this application.

For example, this application further provides a communication apparatus. FIG. 6 is a schematic diagram of a structure of a communication apparatus according to an embodiment of this application. A communication apparatus 10 in this application is configured to implement an operation corresponding to the terminal device in any one of the foregoing method embodiments. As shown in FIG. 6, the communication apparatus 10 may include a first receiving module 11 and a processing module 12.

The first receiving module 11 is configured to receive a first message from a network device, where the first message indicates a terminal device to measure a reference signal of a first cell and report a configuration measurement result in a physical layer coding format, and the first cell includes at least one non-serving cell of a terminal device, or the first cell includes at least one serving cell and the at least one non-serving cell of the terminal device. The processing module 12 is configured to obtain a measurement result of the first cell based on the first message, where the measurement result of the first cell is used by the terminal device to perform cell selection, cell reselection, or cell handover.

In some embodiments, the first receiving module 11 is further configured to receive a second message from the network device, where the second message indicates the terminal device to report the measurement result of the first cell to the network device. Alternatively, the first message indicates the terminal device to report the measurement result of the first cell to the network device.

Figure 7:
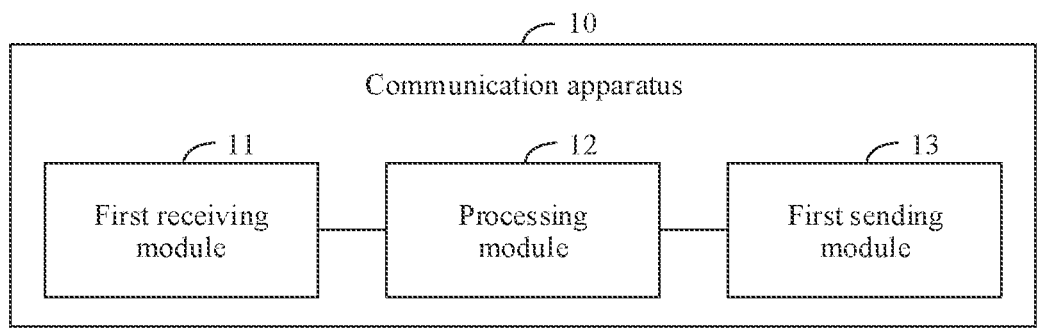
FIG. 7 is a schematic diagram of a structure of a communication apparatus according to an embodiment of this application.

FIG. 7 is a schematic diagram of a structure of a communication apparatus according to an embodiment of this application. As shown in FIG. 7, based on the structure shown in FIG. 6, a communication apparatus 10 in this application may further include a first sending module 13.

The processing module 12 is further configured to perform physical layer coding format processing on the measurement result of the first cell based on the first message, to obtain a measurement result of the first cell in the physical layer coding format. The first sending module 13 is configured to report a third message to the network device, where the third message includes the measurement result of the first cell in the physical layer coding format.

In some embodiments, the first receiving module 11 is further configured to receiving a fourth message from the network device, where the fourth message is obtained based on the measurement result of the first cell in the physical layer coding format, and the fourth message indicates the terminal device to perform cell selection, cell reselection, or cell handover. The processing module 12 is further configured to perform cell selection, cell reselection, or cell handover based on the fourth message.

In some embodiments, the processing module 12 is further configured to perform cell selection, cell reselection, or cell handover based on the measurement result of the first cell.

In some embodiments, the processing module 12 is specifically configured to: obtain a first threshold; and perform cell selection, cell reselection, or cell handover based on the measurement result of the first cell and the first threshold.

In some embodiments, the first receiving module 11 is further configured to receive a fifth message from the network device, where the fifth message indicates a maximum quantity of first cells and/or a cell set of the first cells that are measured by the terminal device based on the first message.

In some embodiments, the first sending module 13 is further configured to send a sixth message to the network device, where the sixth message indicates whether the terminal device has a capability of measuring the first cell.

In some embodiments, the processing module 12 is specifically configured to measure the reference signal of the first cell based on a physical layer measurement metric, to obtain the measurement result of the first cell.

In some embodiments, the first message and the fifth message include at least one of the following messages:

radio resource control layer information, media access control layer control information, or physical layer dynamic control information.

In some embodiments, information in the first message includes at least one of the following information:

first information, where the first information is used by the terminal device to measure the reference signal of the first cell;

second information, where the second information indicates the terminal device to invoke third information, and the third information is used to obtain the measurement result of the first cell; or fourth information, where the fourth information indicates the terminal device to invoke the measurement result of the first cell.

In some embodiments, when the first message includes the first information, the first message or another message is further used to trigger the terminal device to measure the reference signal of the first cell based on the first information, to obtain the measurement result of the first cell. Alternatively, when the first message includes the second information, the first message or another message is further used to trigger the terminal device to invoke the third information based on the second information and measure the first cell based on the third information, to obtain the measurement result of the first cell. Alternatively, when the first message includes the fourth information, the first message or another message is further used to trigger the terminal device to invoke the measurement result of the first cell based on the fourth information. The another message is different from the first message.

In some embodiments, the first message or the another message is further used to configure each reference signal in the third information to be at least one of periodic, semi-persistent, or aperiodic.

In some embodiments, when the first message includes the first information, the first information specifically includes configuration information of the reference signal of the first cell, configuration information of a QCL relationship between the serving cell and the non-serving cell in the first cell, and configuration information of beam failure recovery management of the first cell.

In some embodiments, the first message or the another message is further used to trigger the terminal device to report the measurement result of the first cell to the network device, or is further used to trigger the terminal device to report a measurement result of the non-serving cell in the first cell to the network device, or is further used to trigger the terminal device to report a measurement result of the serving cell in the first cell to the network device. The another message is different from the first message.

In some embodiments, the first message or the another message is further used to configure a reporting manner of a measurement result.

In some embodiments, the reporting manner is a manner of reporting after performing physical layer coding format processing on the measurement result of the first cell. Alternatively, the reporting manner is a manner of reporting after performing physical layer coding format processing on the measurement result of the first cell and indicated identification information corresponding to the measurement result of the first cell. Alternatively, the reporting manner is a manner of reporting after performing physical layer coding format processing on the measurement result of the first cell and identification information of a reference signal corresponding to the measurement result of the first cell. Alternatively, the reporting manner is a manner of reporting after performing physical layer coding format processing on the measurement result of the first cell, identification information of a reference signal corresponding to the measurement result of the first cell, and identification information of a cell corresponding to the measurement result of the first cell. Alternatively, the reporting manner is a manner of reporting after performing physical layer coding format processing on the measurement result of the non-serving cell in the first cell. Alternatively, the reporting manner is a manner of reporting after performing physical layer coding on the measurement result of the non-serving cell in the first cell and identification information of a cell corresponding to the measurement result of the non-serving cell in the first cell. Alternatively, the reporting manner is a manner of reporting after performing physical layer coding format processing on the measurement result of the non-serving cell in the first cell and identification information of a reference signal corresponding to the measurement result of the non-serving cell in the first cell. Alternatively the reporting manner is a manner of reporting after performing physical layer coding format processing on the measurement result of the non-serving cell in the first cell, identification information of a cell corresponding to the measurement result of the non-serving cell in the first cell, and identification information of a reference signal corresponding to the measurement result of the non-serving cell in the first cell. Alternatively, the reporting manner is a manner of reporting after performing physical layer coding format processing on the measurement result of the first cell, identification information of a cell corresponding to the measurement result of the non-serving cell in the first cell, and identification information of a reference signal corresponding to the measurement result of in the first cell.

In some embodiments, the first message or the another message is further used to configure the terminal device to perform physical layer coding on identification information of one of a plurality of same cells.

In some embodiments, the identification information of the cell includes a cell ID or other information, and the other information is mapped to the cell ID.

The communication apparatus in this application may be configured to execute the technical solutions of the terminal device in the method embodiments shown in FIG. 3 to FIG. 5. Implementation principles and technical effects thereof are similar. For operations implemented by the modules, further refer to related descriptions in the method embodiments. Details are not described herein again. The module herein may alternatively be replaced with a component or a circuit.

Figure 8:
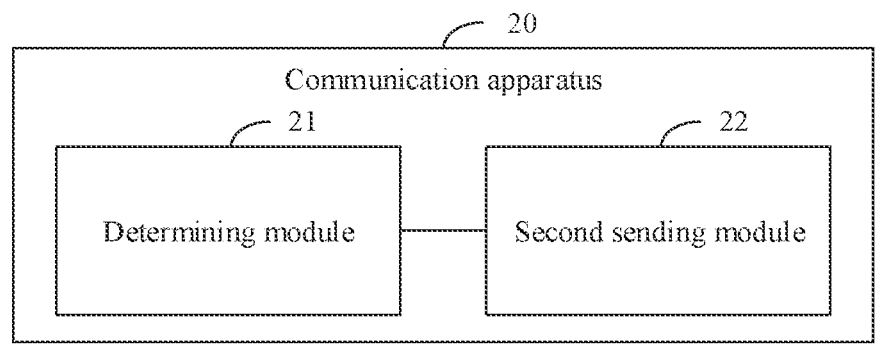
FIG. 8 is a schematic diagram of a structure of a communication apparatus according to an embodiment of this application.

For example, this application further provides a communication apparatus. FIG. 8 is a schematic diagram of a structure of a communication apparatus according to an embodiment of this application. A communication apparatus 20 in this application is configured to implement an operation corresponding to the network device in any one of the foregoing method embodiments. As shown in FIG. 8, the communication apparatus 20 may include a determining module 21 and a second sending module 22.

The determining module 21 is configured to determining a first message, where the first message indicates a terminal device to measure a reference signal of a first cell and report a configuration measurement result in a physical layer coding format, and the first cell includes at least one non-serving cell of a terminal device, or the first cell includes at least one serving cell and the at least one non-serving cell of the terminal device. The second sending module 22 is configured to send the first message to the terminal device.

In some embodiments, the second sending module 22 is further configured to send a second message to the terminal device, where the second message indicates the terminal device to report a measurement result of the first cell to a network device. Alternatively, the first message indicates the terminal device to report the measurement result of the first cell to the network device.

Figure 9:
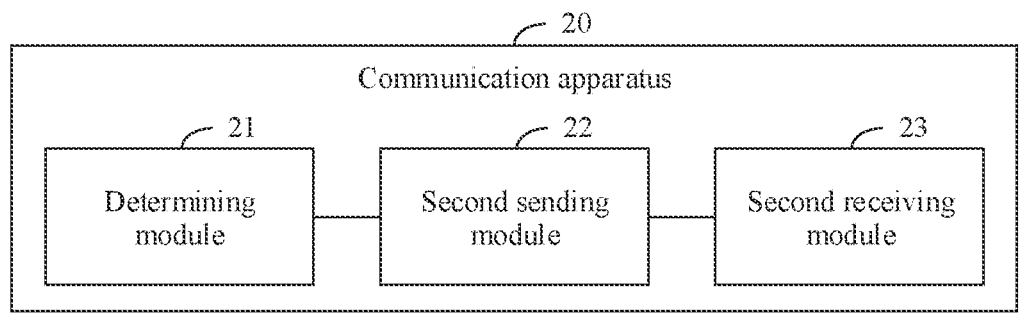
FIG. 9 is a schematic diagram of a structure of a communication apparatus according to an embodiment of this application.

FIG. 9 is a schematic diagram of a structure of a communication apparatus according to an embodiment of this application. As shown in FIG. 9, based on the structure shown in FIG. 8, the communication apparatus 20 in this application may further include a second receiving module 23.

The second receiving module 23 is configured to receive a third message from the terminal device, where the third message includes a measurement result of the first cell in the physical layer coding format, and the measurement result of the first cell in the physical layer coding format is obtained by the terminal device by performing physical layer coding format processing on the measurement result of the first cell based on the first message. The second sending module 22 is further configured to send a fourth message to the terminal device, where the fourth message is obtained based on the measurement result of the first cell in the physical layer coding format, and the fourth message indicates the terminal device to perform cell selection, cell reselection, or cell handover.

In some embodiments, the second sending module 22 is further configured to send a fifth message to the terminal device, where the fifth message indicates a maximum quantity of first cells and/or a cell set of the first cells that are measured by the terminal device based on the first message.

In some embodiments, the determining module 21 is specifically configured to: receive a sixth message from the terminal device, where the sixth message indicates whether the terminal device has a capability of measuring the first cell; and determine the first message based on the sixth message. Alternatively, the determining module 21 is specifically configured to obtain predefined information indicating whether the terminal device has the capability of measuring the first cell, and determine the first message based on the information.

In some embodiments, information in the first message includes at least one of the following information:

first information, where the first information is used by the terminal device to measure the reference signal of the first cell;

second information, where the second information indicates the terminal device to invoke third information, and the third information is used to obtain the measurement result of the first cell; or fourth information, where the fourth information indicates the terminal device to invoke the measurement result of the first cell.

In some embodiments, when the first message includes the first information, the first message or another message is further used to trigger the terminal device to measure the reference signal of the first cell based on the first information, to obtain the measurement result of the first cell. Alternatively, when the first message includes the second information, the first message or another message is further used to trigger the terminal device to invoke the third information based on the second information and measure the first cell based on the third information, to obtain the measurement result of the first cell. Alternatively, when the first message includes the fourth information, the first message or another message is further used to trigger the terminal device to invoke the measurement result of the first cell based on the fourth information. The another message is different from the first message.

In some embodiments, the first message or the another message is further used to configure each reference signal in the third information to be at least one of periodic, semi-persistent, or aperiodic.

In some embodiments, when the first message includes the first information, the first information specifically includes configuration information of the reference signal of the first cell, configuration information of a QCL relationship between the serving cell and the non-serving cell in the first cell, and configuration information of beam failure recovery management of the first cell.

In some embodiments, the first message or the another message is further used to trigger the terminal device to report the measurement result of the first cell to the network device, or is further used to trigger the terminal device to report a measurement result of the non-serving cell in the first cell to the network device, or is further used to trigger the terminal device to report a measurement result of the serving cell in the first cell to the network device. The another message is different from the first message.

In some embodiments, the first message or the another message is further used to configure a reporting manner of a measurement result.

In some embodiments, the reporting manner is a manner of reporting after performing physical layer coding format processing on the measurement result of the first cell. Alternatively, the reporting manner is a manner of reporting after performing physical layer coding format processing on the measurement result of the first cell and indicated identification information corresponding to the measurement result of the first cell. Alternatively, the reporting manner is a manner of reporting after performing physical layer coding format processing on the measurement result of the first cell and identification information of a reference signal corresponding to the measurement result of the first cell. Alternatively, the reporting manner is a manner of reporting after performing physical layer coding format processing on the measurement result of the first cell, identification information of a reference signal corresponding to the measurement result of the first cell, and identification information of a cell corresponding to the measurement result of the first cell. Alternatively, the reporting manner is a manner of reporting after performing physical layer coding format processing on the measurement result of the non-serving cell in the first cell. Alternatively, the reporting manner is a manner of reporting after performing physical layer coding on the measurement result of the non-serving cell in the first cell and identification information of a cell corresponding to the measurement result of the non-serving cell in the first cell. Alternatively, the reporting manner is a manner of reporting after performing physical layer coding format processing on the measurement result of the non-serving cell in the first cell and identification information of a reference signal corresponding to the measurement result of the non-serving cell in the first cell. Alternatively the reporting manner is a manner of reporting after performing physical layer coding format processing on the measurement result of the non-serving cell in the first cell, identification information of a cell corresponding to the measurement result of the non-serving cell in the first cell, and identification information of a reference signal corresponding to the measurement result of the non-serving cell in the first cell. Alternatively, the reporting manner is a manner of reporting after performing physical layer coding format processing on the measurement result of the first cell, identification information of a cell corresponding to the measurement result of the non-serving cell in the first cell, and identification information of a reference signal corresponding to the measurement result of in the first cell.

In some embodiments, the first message or the another message is further used to configure the terminal device to perform physical layer coding on identification information of one of a plurality of same cells.

In some embodiments, the identification information of the cell includes a cell ID or other information, and the other information is mapped to the cell ID.

The communication apparatus in this application may be configured to execute the technical solutions of the network device in the method embodiments shown in FIG. 3 to FIG. 5. Implementation principles and technical effects thereof are similar. For operations implemented by the modules, further refer to related descriptions in the method embodiments. Details are not described herein again. The module herein may alternatively be replaced with a component or a circuit.

In this application, functional modules of the communication apparatus may be obtained through division based on the foregoing method examples. For example, each functional module may be obtained through division in correspondence to each function, or two or more functions may be integrated into one processing module. The integrated module may be implemented in a form of hardware, or may be implemented in a form of a software functional module. It should be noted that, in this embodiment of this application, module division is merely an example, and is merely a logical function division. In actual implementation, another division manner may be used.

Figure 10:
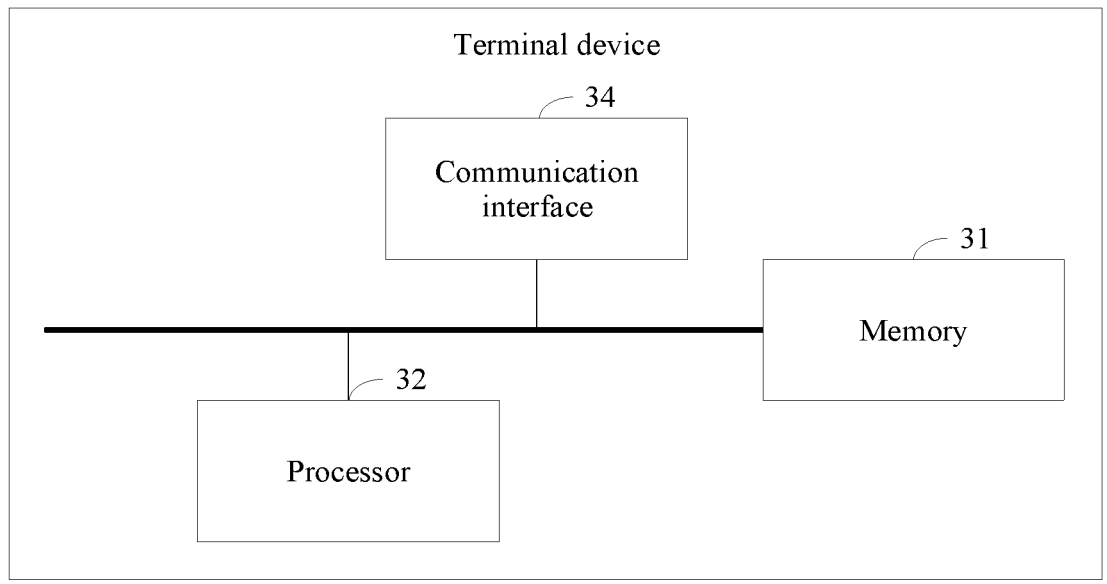
FIG. 10 is a schematic diagram of a structure of a terminal device according to an embodiment of this application.

FIG. 10 is a schematic diagram of a structure of a terminal device according to an embodiment of this application. The terminal device may include:

a memory 31, configured to store program instructions, where the memory 31 may be a flash (flash memory); and a processor 32, configured to invoke and execute the program instructions in the memory 31, to implement steps corresponding to the terminal device in the communication methods in FIG. 3 to FIG. 5. For details, refer to the related descriptions in the foregoing method embodiments.

The terminal device may further include a communication interface 34, that is, an input/output interface. The communication interface 34 may include an independent output interface and an independent input interface, or may be an integrated interface integrating input and output. The output interface is configured to output data, and the input interface is configured to obtain input data. The output data is a generic term of an output in the foregoing method embodiments, and the input data is a generic term of an input in the foregoing method embodiments.

The terminal device may be configured to perform the steps and/or procedures corresponding to the terminal device in the foregoing method embodiments.

Figure 11:
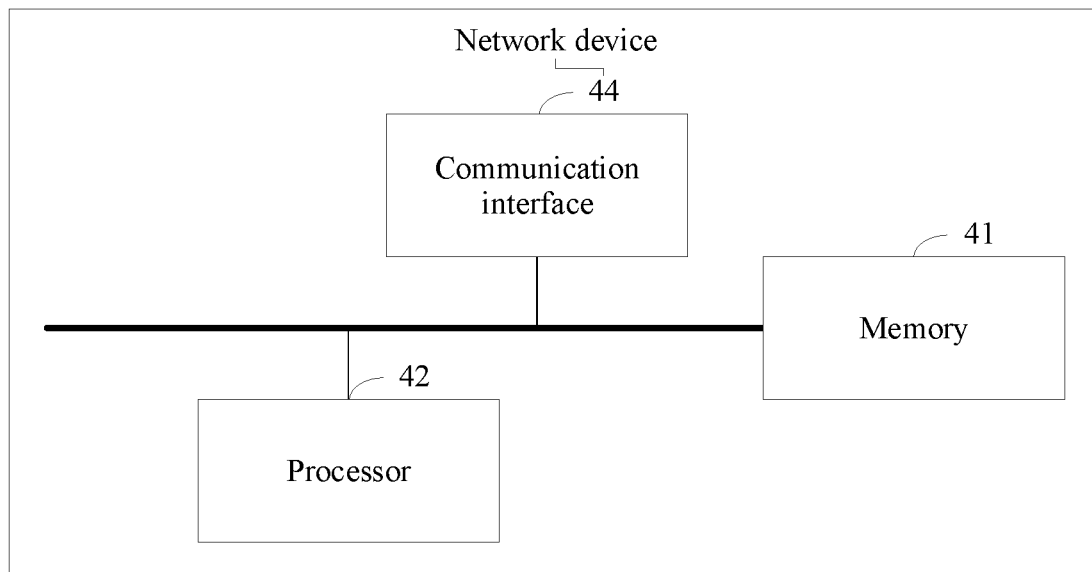
FIG. 11 is a schematic diagram of a structure of a network device according to an embodiment of this application.

FIG. 11 is a schematic diagram of a structure of a network device according to an embodiment of this application. The network device includes: a memory 41, configured to store program instructions, where the memory 41 may be a flash (flash memory); and a processor 42, configured to invoke and execute the program instructions in the memory 41, to implement steps corresponding to the network device in the communication methods in FIG. 3 to FIG. 5. For details, refer to the related descriptions in the foregoing method embodiments.

The network device may further include a communication interface 44, that is, an input/output interface. The communication interface 44 may include an independent output interface and an independent input interface, or may be an integrated interface integrating input and output. The output interface is configured to output data, and the input interface is configured to obtain input data. The output data is a generic term of an output in the foregoing method embodiments, and the input data is a generic term of an input in the foregoing method embodiments.

The network device may be configured to perform the steps and/or procedures corresponding to the network device in the foregoing method embodiments.

This application further provides a readable storage medium. The readable storage medium stores executable instructions. When at least one processor in a terminal device executes the executable instructions, the terminal device is enabled to perform the communication method in the foregoing method embodiments.

This application further provides a readable storage medium. The readable storage medium stores executable instructions. When at least one processor in a network device executes the executable instructions, the network device is enabled to perform the communication method in the foregoing method embodiments.

This application further provides a program product. The program product includes executable instructions, and the executable instructions are stored in a readable storage medium. At least one processor in a terminal device may read the executable instructions from the readable storage medium. The at least one processor executes the executable instructions, so that the terminal device performs the communication method in the foregoing method embodiments.

This application further provides a program product. The program product includes executable instructions, and the executable instructions are stored in a readable storage medium. At least one processor in a network device may read the executable instructions from the readable storage medium. The at least one processor executes the executable instructions, so that the network device performs the communication method in the foregoing method embodiments.

This application further provides a chip. The chip is connected to a memory, or a memory is integrated into the chip. When a software program stored in the memory is executed, the communication method in the foregoing method embodiments is implemented.

A person of ordinary skill in the art may understand that all or some of the foregoing embodiments may be implemented by using software, hardware, firmware, or any combination thereof. When the software is used to implement the embodiments, all or a part of the embodiments may be implemented in a form of a computer program product.

The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The available medium may be a magnetic medium (for example, a floppy disk, a hard disk, or a magnetic tape), an optical medium (for example, a DVD), a semiconductor medium (for example, a solid-state drive Solid-State Drive (SSD)), or the like.

What is claimed is:

1. A communication method, comprising:
   receiving a first message from a network device, wherein the first message indicates a terminal device to measure a reference signal of a first cell and report a configuration measurement result, and wherein the first message comprises an indicator, and the indicator indicates whether a physical layer coding format is to be used to report the configuration measurement result, and the first cell comprises at least one non-serving cell of a terminal device; and
   obtaining a measurement result of the first cell based on the first message.

2. The method according to claim 1, wherein
   the first message indicates the terminal device to report the measurement result of the first cell to the network device; or
   wherein the method further comprises: receiving a second message from the network device, wherein the second message indicates the terminal device to report the measurement result of the first cell to the network device.

3. The method according to claim 1, wherein the method further comprises:
   performing physical layer coding format processing on the measurement result of the first cell based on the first message, to obtain a measurement result of the first cell in the physical layer coding format; and
   reporting a third message to the network device, wherein the third message comprises the measurement result of the first cell in the physical layer coding format.

4. The method according to claim 1, wherein the first message indicates at least one of a maximum quantity of first cells that are measured by the terminal device based on the first message, or a cell set of first cells that are measured by the terminal device based on the first message.

5. The method according to claim 1, wherein the method further comprises:
   receiving a fifth message from the network device, wherein the fifth message indicates at least one of a maximum quantity of first cells or a cell set of the first cells that are measured by the terminal device based on the first message.

6. The method according to claim 1, wherein the method further comprises:
   sending a sixth message to the network device, wherein the sixth message indicates whether the terminal device has a capability of measuring the first cell.

7. The method according to claim 1, wherein the report a configuration measurement result comprises:
   report a configuration measurement result in a physical layer coding format in a physical uplink control channel (PUCCH) or physical uplink share channel (PUSCH).

8. The method according to claim 1, wherein the first cell further comprises at least one serving cell of the terminal device.

9. A communication method, comprising:
   determining a first message, wherein the first message indicates a terminal device to measure a reference signal of a first cell and report a configuration measurement result, and wherein the first message comprises an indicator, and the indicator indicates whether a physical layer coding format is to be used to report the configuration measurement result, and the first cell comprises at least one non-serving cell of a terminal device; and
   sending the first message to the terminal device.

10. The method according to claim 9, wherein
    the first message indicates the terminal device to report a measurement result of the first cell to a network device; or
    wherein the method further comprises: sending a second message to the terminal device, wherein the second message indicates the terminal device to report the measurement result of the first cell to the network device.

11. The method according to claim 9, wherein the method further comprises:
    sending a fifth message to the terminal device, wherein the fifth message indicates at least one of a maximum quantity of first cells or a cell set of the first cells that are measured by the terminal device based on the first message.

12. The method according to claim 9, wherein the determining a first message comprises:
    receiving a sixth message from the terminal device, wherein the sixth message indicates whether the terminal device has a capability of measuring the first cell; and determining the first message based on the sixth message; or
    obtaining predefined information indicating whether the terminal device has the capability of measuring the first cell, and determining the first message based on the information.

13. A communication apparatus, comprising:
    a transceiver;
    at least one processor; and
    one or more memories coupled to the at least one processor and storing programming instructions for execution by the at least one processor to cause the communication apparatus to:
    control the transceiver to receive a first message from a network device, wherein the first message indicates a terminal device to measure a reference signal of a first cell and report a configuration measurement result, and wherein the first message comprises an indicator, and the indicator indicates whether a physical layer coding format is to be used to report the configuration measurement result, and the first cell comprises at least one non-serving cell of a terminal device; and obtain a measurement result of the first cell based on the first message.

14. The apparatus according to claim 13, wherein the first message indicates the terminal device to report the measurement result of the first cell to the network device; or wherein the programming instructions, when executed by the at least one processor, cause the apparatus to:

control the transceiver to receive a second message from the network device, wherein the second message indicates the terminal device to report the measurement result of the first cell to the network device.

15. The apparatus according to claim 13, wherein the programming instructions, when executed by the at least one processor, cause the apparatus to:

before controlling the transceiver to report the measurement result of the first cell to the network device, perform processing of physical layer coding format on the measurement result of the first cell based on the first message, to obtain a measurement result of the first cell in the physical layer coding format; and control the transceiver to report a third message to the network device, wherein the third message comprises the measurement result of the first cell in the physical layer coding format.

16. The apparatus according to claim 13, wherein the first message indicates at least one of a maximum quantity of first cells that are measured by the terminal device based on the first message, or a cell set of first cells that are measured by the terminal device based on the first message.

17. The apparatus according to claim 13, wherein the programming instructions, when executed by the at least one processor, cause the apparatus to:

control the transceiver to receive a fifth message from the network device, wherein the fifth message indicates at least one of a maximum quantity of first cells or a cell set of the first cells that are measured by the terminal device based on the first message.

18. The apparatus according to claim 13, wherein the programming instructions, when executed by the at least one processor, cause the apparatus to:

control the transceiver to send a sixth message to the network device, wherein the sixth message indicates whether the terminal device has a capability of measuring the first cell.

19. The apparatus according to claim 13, wherein the report a configuration measurement result comprises:

report a configuration measurement result in a physical layer coding format in a physical uplink control channel (PUCCH) or physical uplink share channel (PUSCH).

20. A communication apparatus, comprising:

a transceiver;

at least one processor; and one or more memories coupled to the at least one processor and storing programming instructions for execution by the at least one processor to cause the communication apparatus to:

determine a first message, wherein the first message indicates a terminal device to measure a reference signal of a first cell and report a configuration measurement result, and wherein the first message comprises an indicator, and the indicator indicates whether a physical layer coding format is to be used to report the configuration measurement result, and the first cell comprises at least one non-serving cell of a terminal device; and control the transceiver to send the first message to the terminal device.

21. The apparatus according to claim 20, wherein the programming instructions, when executed by the at least one processor, cause the apparatus to: control the transceiver to send a second message to the terminal device, wherein the second message indicates the terminal device to report a measurement result of the first cell to a network device; or the first message indicates the terminal device to report the measurement result of the first cell to the network device.

22. The apparatus according to claim 20, wherein the programming instructions, when executed by the at least one processor, cause the apparatus to:

control the transceiver to send a fifth message to the terminal device, wherein the fifth message indicates at least one of a maximum quantity of first cells or a cell set of the first cells that are measured by the terminal device based on the first message.

23. The apparatus according to claim 20, wherein the programming instructions, when executed by the at least one processor, cause the apparatus to:

control the transceiver to receive a sixth message from the terminal device, wherein the sixth message indicates whether the terminal device has a capability of measuring the first cell;

and determine the first message based on the sixth message; or obtain predefined information indicating whether the terminal device has the capability of measuring the first cell, and determining the first message based on the information.

* * * * *